US012610260B2

(12) United States Patent
Gaurav et al.

(10) Patent No.: US 12,610,260 B2
(45) Date of Patent: Apr. 21, 2026

(54) MACHINE LEARNING SYSTEM FOR PREDICTION OF RESOURCE USAGE BY 5G NETWORK SLICES OR CELLS

(71) Applicant: Juniper Networks, Inc., Sunnyvale, CA (US)

(72) Inventors: Aman Gaurav, Lucknow (IN); Moksha Kuldipbhai Vora, Ahmedabad (IN); Ajit Krishna Patankar, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 326 days.

(21) Appl. No.: 18/400,029

(22) Filed: Dec. 29, 2023

(65) Prior Publication Data

US 2025/0220457 A1 Jul. 3, 2025

(51) Int. Cl.
*H04W 24/02* (2009.01)
*H04W 24/08* (2009.01)
*H04W 72/04* (2023.01)

(52) U.S. Cl.
CPC ........... *H04W 24/02* (2013.01); *H04W 24/08* (2013.01); *H04W 72/04* (2013.01)

(58) Field of Classification Search
CPC ..... H04W 24/02; H04W 24/08; H04W 72/04; H04W 24/04; H04L 41/5019; H04L 41/147; H04L 41/16; G06N 20/00
See application file for complete search history.

(56) References Cited

U.S. PATENT DOCUMENTS

| | | | |
|---|---|---|---|
| 11,063,842 B1 | 7/2021 | Vasseur et al. | |
| 2023/0105365 A1 | 4/2023 | Jung | |
| 2023/0209367 A1* | 6/2023 | Chang | G06N 20/00 |
| | | | 455/423 |
| 2024/0296342 A1* | 9/2024 | Isaksson | G06N 3/098 |

(Continued)

OTHER PUBLICATIONS

3GPP, "3rd Generation Partnership Project; Technical Specification Group Services and System Aspects; System architecture for the 5G System (5GS); Stage 2 (Release 17)", 3GPP A Global Initiative, vol. 17, 3GPP Organizational Partners, Mar. 2021, 489 pp.

(Continued)

*Primary Examiner* — Abdullahi Ahmed
(74) *Attorney, Agent, or Firm* — Shumaker & Sieffert P.A.

(57) ABSTRACT

A machine learning system is trained to predict resource usage by cells or network slices of a mobile network. For example, a computing system obtains respective datasets for the cells or network slices. Each dataset comprises time steps and respective values for a performance metric of the corresponding one of the cells or network slices. The computing system groups, based on a clustering algorithm applied to (1) the datasets, or (2) the cells or network slices, the datasets into clusters of datasets. The computing system applies, to a subset of most-recent time steps and corresponding values of each dataset of a first cluster of the clusters, a transformation to obtain a set of time steps and corresponding standardized values with which a machine learning system is trained to generate predicted values at future time steps of the datasets of the first cluster.

20 Claims, 8 Drawing Sheets

(56)  References Cited

U.S. PATENT DOCUMENTS

2025/0106132 A1* 3/2025 Taghia ................. H04L 43/067
2025/0344233 A1* 11/2025 Cyril .................... H04W 24/02

OTHER PUBLICATIONS

3GPP, "3rd Generation Partnership Project; Technical Specification Group Services and System Aspects; System architecture for the 5G System (5GS); Stage 2 (Release 18)", 3GPP A Global Initiative, vol. 18, No. 2, 3GPP Organizational Partners, Jul. 2023, 694 pp.
O-RAN Alliance, "O-RAN Architecture Description", vol. 7, Oct. 21, 2022, 38 pp.
Extended Search Report from counterpart European Application No. 24210245.7 dated Mar. 31, 2025, 9 pp.

* cited by examiner

202

| Time | Cell 1 | Cell 2 | ... | Cell N |
|---|---|---|---|---|
| 0 | 32.55365 | 44.69209 | ... | 0 |
| 1 | 43.37288 | 39.42537 | ... | 0 |
| 2 | 40.28593 | 35.68285 | ... | 22.77739 |
| 3 | 37.30918 | 34.13882 | ... | 29.37051 |
| 4 | 57.2409 | 34.71681 | ... | 0 |
| ... | ... | ... | ... | ... |
| 10 | 24.26144 | 15.0126 | ... | 33.28683 |
| 11 | 23.78916 | 21.64302 | ... | 0 |
| 12 | 23.03287 | 18.45264 | ... | 0 |
| 13 | 18.37283 | 20.8624 | ... | 24.3437 |
| 14 | 25.58146 | 22.43807 | ... | 0 |
| 15 | 24.10846 | 17.10884 | ... | 0 |

DL Throughput of N cells

204

| Cell | x_0 | x_1 | x_2 | ... | x_12 | y |
|---|---|---|---|---|---|---|
| 1 | 32.5536 | 43.37288 | 40.28593 | ... | 23.03287 | 18.97283 |
| 1 | 43.37288 | 40.28593 | 37.30918 | ... | 18.97283 | 25.58146 |
| ... | ... | ... | ... | ... | ... | ... |
| 2 | 44.69209 | 39.42537 | 35.68285 | ... | 18.45264 | 20.8624 |
| 2 | 39.42537 | 35.68285 | 34.13882 | ... | 20.6624 | 22.43807 |
| ... | ... | ... | ... | ... | ... | ... |
| N-1 | 47.6317 | 59.62211 | 39.56324 | ... | 30.43613 | 40.08536 |

Merged Training Dataset with Feature Space having 'n_steps'=13 for Similar Cells

206

| Cell | x_0 | x_1 | x_2 | ... | x_12 | y |
|---|---|---|---|---|---|---|
| 1 | -0.085344 | 1.383233 | 0.964190 | ... | -1.37785 | -1.92899 |
| 1 | 1.420803 | 1.055772 | 0.703772 | ... | -1.46449 | -0.683302 |
| ... | ... | ... | ... | ... | ... | ... |
| 2 | 1.678317 | 1.152804 | 0.796196 | ... | 0.89163 | -0.67816 |
| 2 | 1.668334 | 1.233834 | 1.055400 | ... | 0.50198 | -0.29678 |
| ... | ... | ... | ... | ... | ... | ... |
| N-1 | 0.296675 | 1.046139 | 0.419875 | ... | -0.77567 | -0.37275 |

Scaled Windowed Training Dataset

FIG. 2

Time                                                                                    Present Row 1

Row 2

Row 3

Row 4

Row 5

Available Historical Time Series

Dropped          Training          Forecasting

Sliding Window

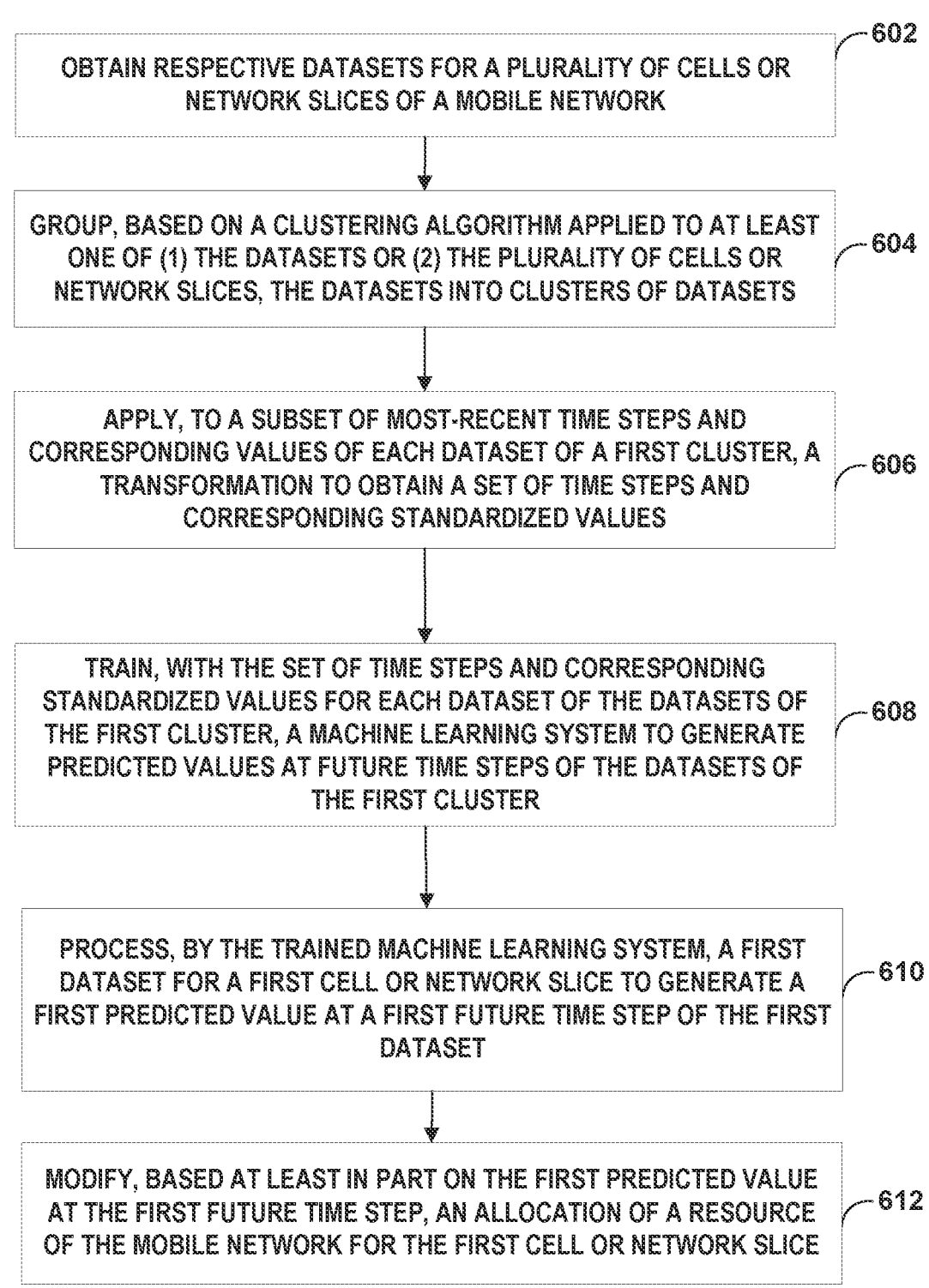

OBTAIN RESPECTIVE DATASETS FOR A PLURALITY OF CELLS OR NETWORK SLICES OF A MOBILE NETWORK — 602

GROUP, BASED ON A CLUSTERING ALGORITHM APPLIED TO AT LEAST ONE OF (1) THE DATASETS OR (2) THE PLURALITY OF CELLS OR NETWORK SLICES, THE DATASETS INTO CLUSTERS OF DATASETS — 604

APPLY, TO A SUBSET OF MOST-RECENT TIME STEPS AND CORRESPONDING VALUES OF EACH DATASET OF A FIRST CLUSTER, A TRANSFORMATION TO OBTAIN A SET OF TIME STEPS AND CORRESPONDING STANDARDIZED VALUES — 606

TRAIN, WITH THE SET OF TIME STEPS AND CORRESPONDING STANDARDIZED VALUES FOR EACH DATASET OF THE DATASETS OF THE FIRST CLUSTER, A MACHINE LEARNING SYSTEM TO GENERATE PREDICTED VALUES AT FUTURE TIME STEPS OF THE DATASETS OF THE FIRST CLUSTER — 608

PROCESS, BY THE TRAINED MACHINE LEARNING SYSTEM, A FIRST DATASET FOR A FIRST CELL OR NETWORK SLICE TO GENERATE A FIRST PREDICTED VALUE AT A FIRST FUTURE TIME STEP OF THE FIRST DATASET — 610

MODIFY, BASED AT LEAST IN PART ON THE FIRST PREDICTED VALUE AT THE FIRST FUTURE TIME STEP, AN ALLOCATION OF A RESOURCE OF THE MOBILE NETWORK FOR THE FIRST CELL OR NETWORK SLICE — 612

FIG. 6

MACHINE LEARNING SYSTEM FOR PREDICTION OF RESOURCE USAGE BY 5G NETWORK SLICES OR CELLS

TECHNICAL FIELD

The disclosure generally relates to mobile networks, and to resource management of a mobile network by a controller.

BACKGROUND

Computer networks have become ubiquitous, and the number of network applications, network-connected devices, and types of network-connected devices are rapidly expanding. Such devices now include computers, smartphones, Internet-of-Things (IoT) devices, vehicles, medical devices factory equipment, etc. 5G mobile network architectures enhanced the ability to provide communication services using cloud-based network function virtualization (NFV). Specialized networks can be created using the Radio Access Network (RAN) of a mobile network operator combined with functions of a 5G core. For example, networks can be created for a specific service level agreement (SLA), special use cases, or other specific requirements. Examples of such networks include private mobile networks, industrial networks, a dedicated network for connected vehicles, etc.

SUMMARY

In general, the disclosure describes techniques for training a machine learning system to predict one or more metrics of a 5G network slice or 5G cell within a mobile network such as a 5G mobile network. The machine learning system is adaptable across the numerous different 5G network slices and/or cells that may number in the hundreds of thousands. In some examples, a system as described herein collects a time-series dataset for each of a plurality of network slices or cells. The system performs clustering on time-series datasets to cluster the network slices or cells, then creates a training dataset for each cluster by selecting a sliding window of data from the time-series present in each cluster. The system standardizes the sliding window data subsets of each cluster of similar sliding window data subsets to form a standardized dataset for the cluster. For each cluster of similar sliding window data subsets, the system trains a machine learning system with the standardized dataset for the cluster to predict a value of the dataset at a future time step. The system may use the trained machine learning system to predict the future usage of a 5G network slice or 5G cell, even where such 5G network slice or 5G cell is newly-deployed. The system may use such predictions to dynamically adjust the resources allocated to a network slice or cell so as to more efficiently manage the resources of a mobile network, such as a 5G mobile network. In some examples, a system as described herein is deployed within a cloud-based application, such as an rApp or xApp of a RAN Intelligent Controller (RIC) for a RAN of a mobile network.

For example, a network system may include a Service Management and Orchestration (SMO) framework offering various framework functions along with a non-real-time (non-RT) RIC, configured in accordance with Open Radio Access Network (O-RAN) standards ("O-RAN architecture"), to manage and/or monitor aspects of a RAN and/or 5G core. The O-RAN architecture may include a non-RT RIC and a near-real-time RIC (near-RT RIC) that each executes different functions and services for RAN functions. A non-RT RIC is an orchestration and automation function configured to provide radio resource management, higher layer procedure optimization, policy optimization, and provide guidance, parameters, policies and artificial intelligence (AI) and machine learning (ML) models to support the operation of near-RT RIC functions in the RAN. The non-RT RIC may onboard one or more applications (e.g., rApps) that provide non-real time (e.g., greater than one second) control of RAN elements and their resources, and the near-RT RIC may onboard one or more applications (e.g., xApps) that provide near-real time control of RAN elements and their resources.

The O-RAN architecture includes several interfaces, such as A1, O1, and O2 interfaces, that are each used to provide the functions and services by which the SMO and RIC can configure or direct other components of the RAN. For example, the functions and services of a non-RT RIC may include policy management services and/or enrichment information services for a near-RT RIC that are provided over an A1 interface (collectively referred to herein as "A1 services" because they provided over the A1 interface); Operations, Administration, and Management (OAM) services, such as performance management services and configuration management services, for O-RAN management elements that are provided over an O1 interface (referred to herein as "O1 services" because they are provided over the O1 interface); infrastructure management services and deployment management services for resources of an O-RAN cloud that are provided over an O2 interface (referred to herein as "O2 services" because they are provided over the O2 interface), and/or other services, such as service management and exposure (SME) services (e.g., registration of a service, update of a service registration), data management and exposure (DME) services, and/or AI/ML services.

The techniques of the disclosure may provide specific improvements to the computer-related field of computer networking that have practical applications. For example, a computing system as disclosed herein may be able to more accurately estimate current and predict future metrics, characteristics, and usage rates of individual elements of a mobile network, such as individual network slices and cells within the mobile network. A computing system implementing the techniques described herein may use such estimations and predictions to more efficiently manage the deployment and allocation of resources to each of the network slices and cells within the mobile network, thereby improving the efficiency of the mobile network, reducing overutilization and underutilization of portions of the mobile network, improving load balancing and reducing network congestion within the mobile network, and reducing the administrative burden of managing the mobile network.

In one example, this disclosure describes a computing system comprising processing circuitry having access to a memory, the processing circuitry configured to: obtain respective datasets for a plurality of cells or network slices of a mobile network, each dataset of the datasets comprising time steps and respective values for a performance metric of the corresponding one of the plurality of cells or network slices; group, based on a clustering algorithm applied to at least one of (1) the datasets or (2) the plurality of cells or network slices, the datasets into clusters of datasets; apply, to a subset of most-recent time steps and corresponding values of each dataset of the datasets of a first cluster of the clusters, a transformation to obtain a set of time steps and corresponding standardized values; and train, with the set of time steps and corresponding standardized values for each dataset of the datasets of the first cluster, a machine learning system to generate predicted values at future time steps of the datasets of the first cluster.

In another example, this disclosure describes a method comprising: obtaining, by processing circuitry of a computing system, respective datasets for a plurality of cells or network slices of a mobile network, each dataset of the datasets comprising time steps and respective values for a performance metric of the corresponding one of the plurality of cells or network slices; grouping, by the processing circuitry and based on a clustering algorithm applied to at least one of (1) the datasets or (2) the plurality of cells or network slices, the datasets into clusters of datasets; applying, by the processing circuitry and to a subset of most-recent time steps and corresponding values of each dataset of the datasets of a first cluster of the clusters, a transformation to obtain a set of time steps and corresponding standardized values; and training, by the processing circuitry and with the set of time steps and corresponding standardized values for each dataset of the datasets of the first cluster, a machine learning system to generate predicted values at future time steps of the datasets of the first cluster.

In another example, this disclosure describes a computing system comprising processing circuitry having access to a memory, the processing circuitry configured to: execute a machine learning system configured to process a first dataset for a first cell or network slice of a plurality of cells or network slices of a mobile network to generate a first predicted value at a first future time step of the first dataset, wherein respective datasets for the plurality of cells or network slices, each dataset of the datasets comprising time steps and respective values for a performance metric of the corresponding one of the plurality of cells or network slices, are grouped, based on a clustering algorithm applied to at least one of (1) the datasets or (2) the plurality of cells or network slices, into clusters of datasets, wherein a transformation is applied to a subset of most-recent time steps and corresponding values of each dataset of the datasets of a first cluster of the clusters to obtain a set of time steps and corresponding standardized values, and wherein the machine learning system is trained, with the set of time steps and corresponding standardized values for each dataset of the datasets of the first cluster, to generate predicted values at future time steps of the datasets of the first cluster; and modify, based at least in part on the first predicted value at the first future time step, an allocation of a resource of the mobile network for the first cell or network slice.

The details of one or more examples are set forth in the accompanying drawings and the description below. Other features, objects, and advantages will be apparent from the description and drawings, and from the claims.

BRIEF DESCRIPTION OF DRAWINGS

FIG. 2 is a block diagram illustrating example data sets for training a machine learning system in accordance with the techniques of this disclosure.

FIG. 6 is a flowchart illustrating an example operation in accordance with the techniques of this disclosure.

Like reference characters refer to like elements throughout the figures and text.

DETAILED DESCRIPTION

Figure 1A:
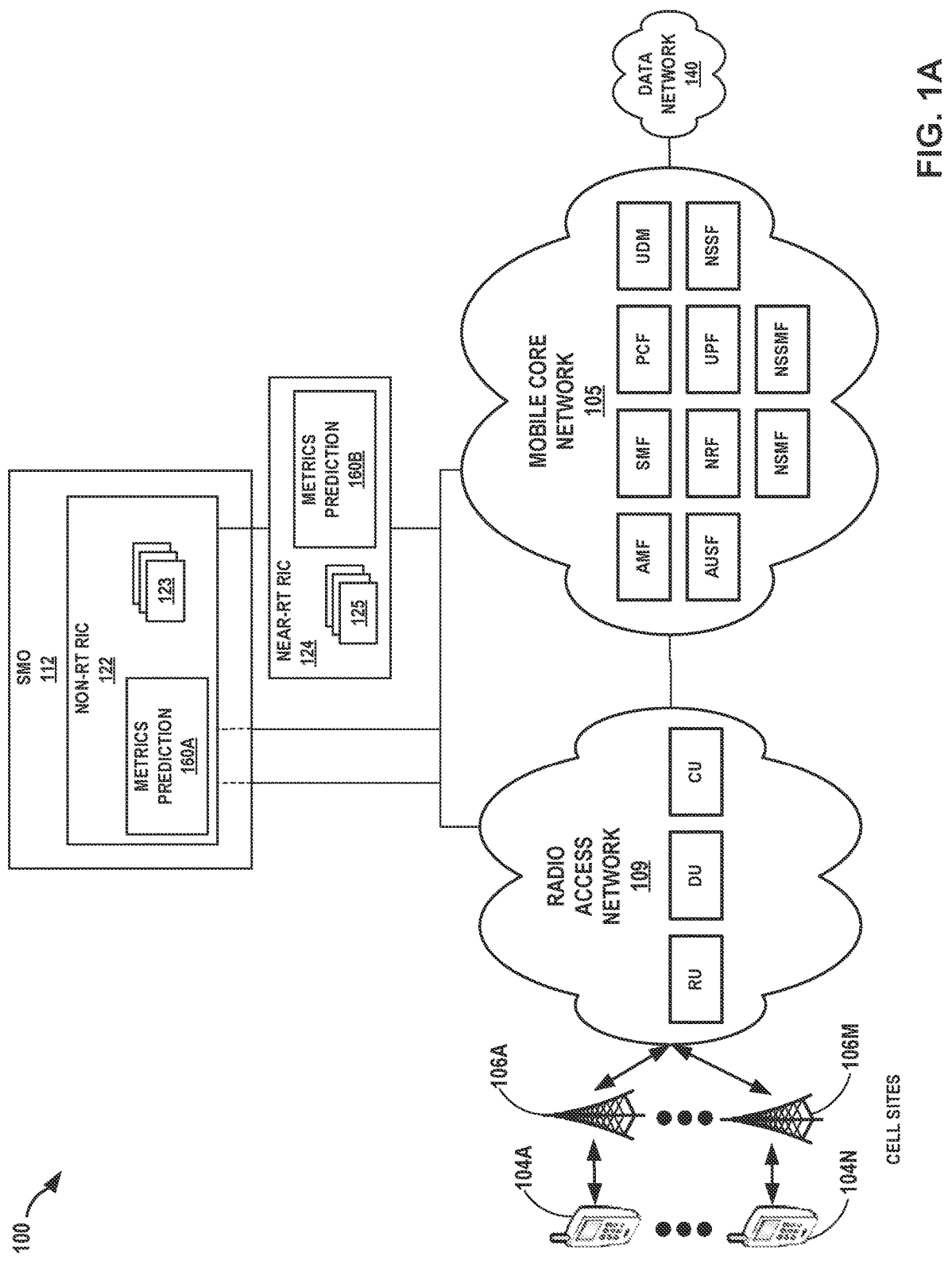
FIG. 1A is a block diagram illustrating an example network system configured to predict future values of a performance metric for a cell or network slice, in accordance with one or more techniques of the disclosure.

The core functionality of a 5G Radio Access Network (RAN) Intelligent Controller (RIC) can be extended using external modules called xApps and rApps. xApps are applications executed by the Near-RT RIC, while rApps are applications executed by the non-RT RIC. Many xApps and rApps have been proposed, including Slice SLA Assurance, Energy Savings, long term slice optimization, and others. These use cases use a data driven approach and embed AI/ML algorithms to achieve optimal results. A common factor in these use cases is the requirement to forecast the network usage and traffic patterns at different levels, such as the cell-level or the slice-level, based on the performance metrics (PMs) of various cells and slices. A 5G slice is a dedicated virtual network instance within the 5G infrastructure tailored to specific application requirements, A 5G cell is a geographical area covered by a single base station in the 5G network providing wireless connectivity to devices. Using the cell-level and slice-level traffic patterns, xApps (within the Near-RT RIC) and rApps (within the non-RT RIC) can allocate resources to each cell and slice to optimize the utilization of 5G network resources.

In the 5G networking field, there is limited intervention with AI/ML. Conventionally, for example, there are not any available solutions that operate as xApps or rApps which make predictions for multiple slices or cells, and there are not any available solutions that can handle multiple key performance indicators (KPIs) through a single or cluster of models. The current industry approach is highly deterministic in nature, and there is not a mechanism for detecting the data distributions of performance metrics of slices or cells and merging the data to train a model efficient framework.

The techniques of the disclosure provide a novel architecture and design that provides numerous benefits. For example, the techniques of the disclosure set forth a novel feature engineering technique to capture the spatial-temporal correlation and cross-correlation among the performance metrics of slices or cells. Further, the techniques of the disclosure enable in-window standardization on data distribution for both univariate and multivariate features. The techniques of the disclosure provide for the application of a model-efficient framework on temporal data in the networking domain. The techniques of the disclosure use a feature engineering methodology for data quality and quantity enhancement and create a feature space that enhances the performance of model-efficient framework. Additionally, a system using the techniques set forth herein may use multiple correlated PMs to enhance the prediction of a desired PM of a slice or cell. The techniques of the disclosure disclose an augmentation method for data using domain expert knowledge regarding correlation between geographical location and performance metrics of a cell. Further, the techniques of the disclosure set forth a novel technique using multiple, small, real datasets from multiple 5G deployments to conditionally create a domain-specific, scalable, combined data source for training the models.

Additionally the techniques of the disclosure may further provide numerous desirable features and advantages. For example, a system as described herein may enable a model-efficient framework, such as a common prediction model, that is trained for different slices or cells for one or more KPIs in the field of 5G networking. A system as described herein may use a common regression or classification model for multiple 5G use cases, such as slice SLA assurance, energy savings, etc. Further, a system as described herein may possess the ability to handle the arrival of new slices or cells for one or more KPIs with reduced initial latency of forecasting, thereby bypassing the inevitable preliminary data analysis required by conventional approaches. In addition, a system using the techniques of the disclosure may use in-window standardization to off-load the overhead of storing data artifacts of each slice or cell and facilitate the inference on the arrival of new slices or cells and dynamic slices. Furthermore, a system in accordance with the techniques of the disclosure may possess the ability to generate a generalized training dataset by merging the data of multiple slices or cells to train the model efficient framework, even with data scarcity. Additionally, the techniques of the disclosure may enable a system to use meta-modeling with fine-tuning for different slices or cells for one or more KPIs as an approach for model-efficient framework. Further, a system as described herein may cluster slices or cells based on the characteristics of the historical PM data, geographical location and domain knowledge.

A system using the techniques set forth herein may have numerous use cases. For example, a system operating in accordance with the techniques of the disclosure may enable an automated deployment framework. The setup allows data collection, pre-processing, training, and inference, followed by a post-processing pipeline to function in an automated manner. Additionally, a system operating in accordance with the techniques of the disclosure may enable scalable ML. The highly configurable architecture described herein may allow integration of multiple slices or cells into the inference pipeline based on the changes in the configuration. A system operating as described herein may further enable the handling of dynamic slices. The architecture described herein provides reduced latency predictions on dynamically created slices. Furthermore, a system operating in accordance with the techniques of the disclosure may enable the dynamic activation or deactivation of network slices or cells, and may provide reduced latency predictions on dynamically activated cells.

FIG. 1A is a block diagram illustrating an example network system configured to predict future values of a performance metric for a cell or network slice, in accordance with one or more techniques of the disclosure. In the example illustrated in FIG. 1A, network system 100 includes Service and Management Orchestrator (SMO) 112, non-RT RIC 122, near-RT RIC 124, one or more radio access networks (RANs), e.g., RAN 109, and mobile core network (or simply "core") 105 that provide user equipment 104A-104N (collectively, "UEs 104") with access to one or more applications or services provided by data network 140.

UEs 104 may represent smartphones, desktop computers, laptop computers, tablets, smart watches, and/or "Internet-of-Things" (IoT) devices, such as cameras, sensors, televisions, appliances, or the like. As shown in FIG. 1A, network system 100 includes RAN 109 that provides network access, data transport, and other services to UEs 104. In some examples, RAN 109 may be an Open Radio Access Network (O-RAN), a 5G mobile network RAN, a 4G LTE mobile network RAN, another type of RAN, or a combination of the above. For example, in a 5G-radio access network, RAN 109 comprises a plurality of cell sites (or simply "cells") that each include radio equipment, such as base stations 106A-106M (collectively, "base stations 106"), also known as gNodeBs, to exchange packetized data within a data network to ultimately access one or more applications or services provided by data network 140. Each of base stations 106 is divided into three functional components: radio unit (RU), distributed unit (DU), and central unit (CU), which can be deployed in various configurations. RU manages the radio frequency layer and has antenna arrays of various sizes and shapes. DU performs lower layer protocol processing. CU performs the upper layer protocol processing. Depending on operator and service requirements, base stations 106 can be deployed monolithically, e.g., RU, DU, and CU reside within a cell site, or these functionalities can be distributed across cell sites while the CU resides in an edge cloud site controlling a plurality of distributed DUs. O-RAN is, for example, an approach to networking in which disaggregated functions can be used to deploy mobile fronthaul and midhaul networks. The disaggregated functions can be cloud-based functions.

Radio access networks 109 connect to core 105 to exchange packets with data network 140. Core 105 may be a 5G core network, and data network 140 may represent, for example, one or more service provider networks and services, the Internet, third party services, one or more IP-VPNs, an IP-multimedia subsystem, a combination thereof, or other network or combination of networks. In some examples, resources associated with the service provided by a mobile network operator to the tenant may be provided by, or managed by, functions of core 105 and/or components of RAN 109. In some examples, core 105 implements various discrete control plane and user plane functions for network system 100. Examples of 5G control plane functions that may be provided by core 105 include Access Mobility Management Function (AMF) that provides access mobility management services, Session Management Function (SMF) that provides session management services, Policy Control Function (PCF) that provides policy control services, User Data Management (UDM) that provides management of network user data, Network Repository Function (NRF) that provides a repository that can be used to register and discover services in a network operator's network, Authentication Server Function (AUSF) that provides authentication services, Network Slice Selection Function (NSSF), Network Slice Management Function (NSMF) that may be used to select an instance of an available network slice for use by any of UE devices 104, and Network Slice Subnet Management Function (NSSMF) that provides coordination, management, and orchestration of network slice subnet instances (NSSI). Core 105 may also include User Plane Functions (UPF) that provides packet routing, forwarding and other network data processing functions (e.g., Quality of Service, packet inspection, traffic optimization etc.). Further details on services and functions provided by the 5G core, can be found in 3$^{rd}$ Generation Partnership Project 2021, *Technical Specification Group Services and System Aspects; System architecture for the 5G System (5GS); Stage 2 (Release 17)*, TS 23.501 V17.0.0 (2021 March), which is superseded by 2021, Technical Specification Group Services and System Aspects; System architecture for the 5G System (5GS); Stage 2 (Release 18), TS 23.501 V18.2.2 (2023 July), the entire contents of each of which are hereby incorporated by reference. Further details on the O-RAN architecture can be found in O-RAN Alliance, "O-RAN Architecture Description," version 7.00, October 2022, the entire contents of which is hereby incorporated by reference.

Aspects of RAN 109 and/or core 105 may be managed and/or monitored by SMO 112, non-RT RIC 122, and near-RT RIC 124. In some examples, SMO 112, non-RT RIC 122, and near-RT RIC 124 may be operated by the mobile network operator providing 5G services to a tenant. SMO 112 can orchestrate and control management and automation aspects of RAN 109 (e.g., network slicing, management, and orchestration of O-Cloud, etc.). Further, SMO 112 may control aspects of non-RT RIC 122 and near-RT RIC 124. Non-RT RIC 122 can provide non-real-time (e.g., greater than one second) control and optimization of RAN elements and resources such as RUs, DUs, and CUs, workflow management, and policy-based control of applications and features of near-RT RIC 124. Near-RT RIC 124 can provide near-real-time (e.g., milliseconds) control and optimization of RAN elements and resources via fine-grained data collection and actions. As further described in FIG. 1B, non-RT RIC 122 and near-RT RIC 124 may deploy as a highly scalable, microservices based containerized architecture. In some examples, near-RT RIC 124 may be located within an edge or regional cloud.

Non-RT RIC 122 may onboard one or more applications, e.g., applications 123 (e.g., rApps of FIG. 1B) that manage non-real time events within non-RT RIC 122, such as applications that do not require response times of less than one second. Applications 123 may leverage the functionality exposed via the non-RT RIC framework of non-RT RIC 122. Applications 123 may be used to control and manage RAN elements and resources, such as near-RT RIC 124, RAN nodes, and/or resources in the O-RAN cloud. Applications 123 may also utilize network data, performance metrics, and subscriber data to provide recommendations for network optimization and operational guidance (e.g., policies) to one or more applications of near-RT RIC 124. Although illustrated as within non-RT RIC 122, any one or more of applications 123 may be executed by a third party, separate from non-RT RIC 122.

As described further below, non-RT RIC 122 may provide services using A1, O1, and O2 interfaces. An A1 interface connects the non-RT RIC 122 and near-RT RIC 124. Non-RT RIC 122 may perform services via the A1 interface, such as policy management services (e.g., creation and update of a policy), ML model management services, and/or enrichment information services. Services performed via the A1 interface are referred to herein as "A1 services." An O1 interface may include an interface that connects SMO 112 with O-RAN managed elements, such as near-RT RIC 124 and/or RAN nodes (e.g., O-RAN centralized unit (O-CU), O-RAN distributed unit (O-DU)). Non-RT RIC 122 may perform services via the O1 interface, such as configuration management services and performance management services of O-RAN managed elements (e.g., operation and maintenance (OAM) services), fault supervision, file management, heartbeat, trace, physical network function (PNF) discovery, software management, etc.). Services performed via the O1 interface are referred to herein as "O1 services." An O2 interface may include an interface that connects SMO 112 to resources of the ORAN O-Cloud. The O-Cloud may comprise of one or more physical infrastructure nodes that host O-RAN functions (e.g., virtual network functions), the supporting software components, and the appropriate management and orchestration functions. Non-RT RIC 122 may perform services via the O2 interface, such as services that provide infrastructure management and/or network function deployment of the resources in the O-Cloud (e.g., discovery and administration of O-Cloud resources; Scale-In, Scale-Out of cloud/deployments; Fault, Configuration, Accounting, Performance, and Security (FCAPS) of cloud/deployments, software management of cloud platform/deployments; create/delete deployment and associated allocated O-Cloud resources). Services performed via the O2 interface are referred to herein as "O2 services." Non-RT RIC 122 may also perform other functions and services, such as service management and exposure (SME) services (e.g., registration of a service, update of a service registration), data management and exposure (DME) services, AI/ML services, or the like.

Figure 1B:
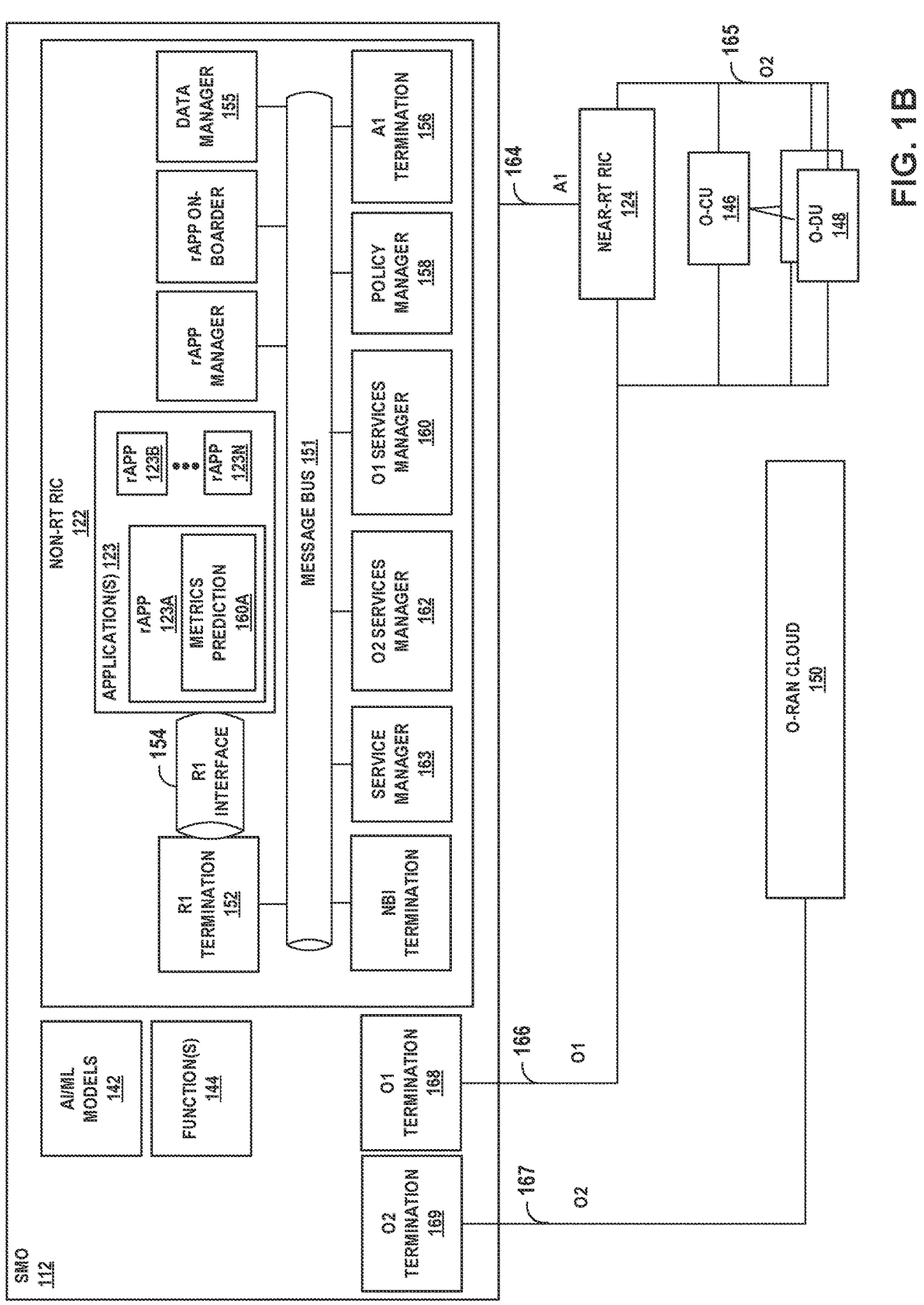
FIG. 1B is a block diagram illustrating further example details of the Non-RT RIC of the Service Management and Orchestration of FIG. 1A.
Figure 1C:
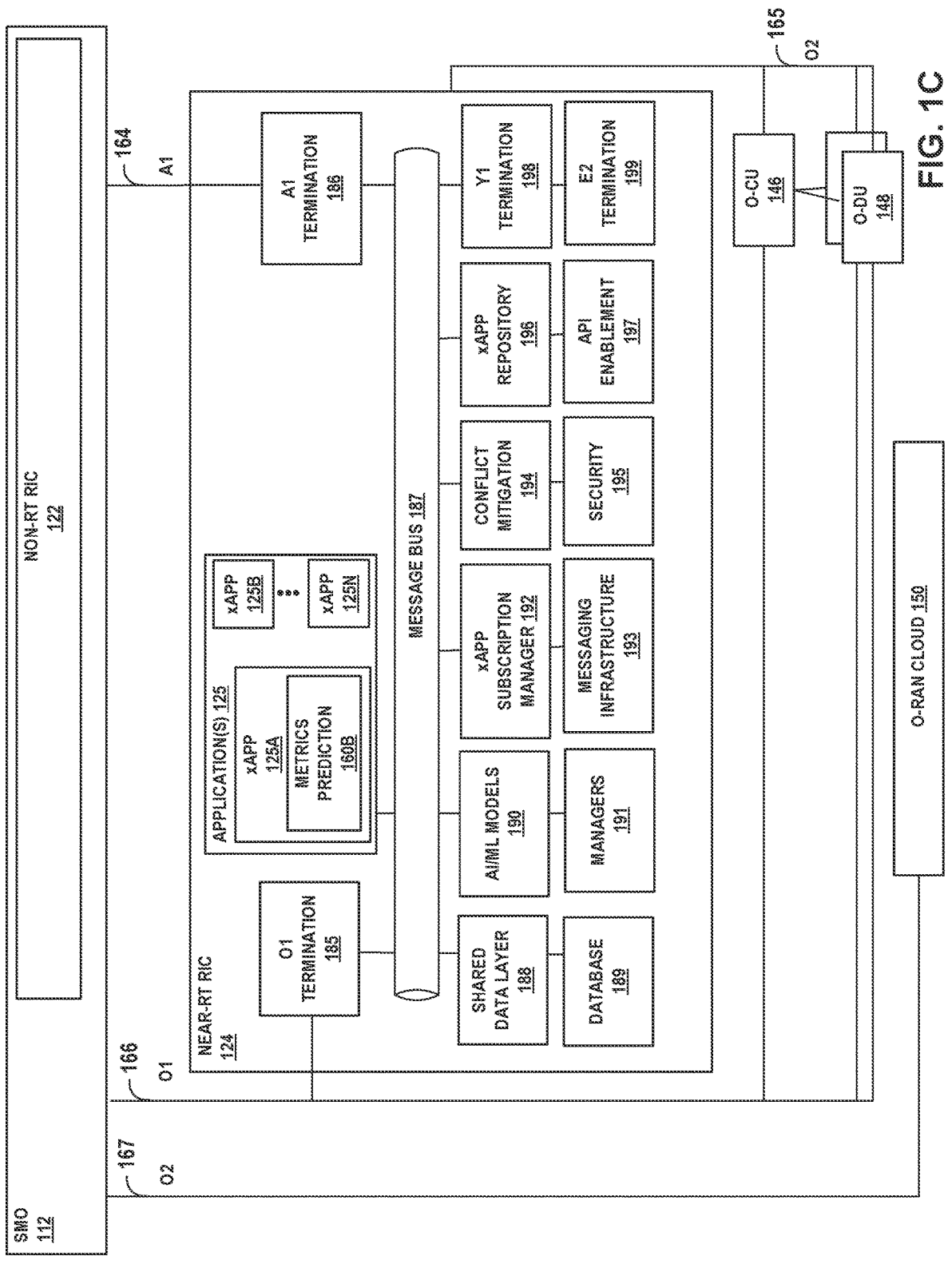
FIG. 1C is a block diagram illustrating further example details of the Near-RT RIC of FIG. 1A.

In accordance with the techniques of the disclosure, non-RT RIC 122 includes metrics prediction 160A and near-RT RIC 124 includes metrics prediction 160B (collectively, "metrics prediction 160"). A RIC, such as non-RT RIC 122 or near-RT RIC 124, uses metrics prediction 160 to predict one or more metrics of a network slice or cell within RAN 109 and/or mobile core network 105. In some examples, the one or more metrics are for a network slice within RAN 109 and/or mobile core network 105. In some examples, the one or more metrics are for a network cell within RAN 109 and/or mobile core network 105. Further, RICs 122, 124 may use the prediction of metrics prediction 160 to adjust or modify the allocation of resources to each network slice or cell within RAN 109 and/or mobile core network 105. As described herein, either or both of non-RT RIC 122 or near-RT RIC may include a respective metrics prediction 160 that may predict one or more metrics of a network slice or cell within RAN 109 and/or mobile core network 105. FIG. 1B, discussed below, provides an example wherein non-RT RIC 122 includes metrics prediction 160A, which predict one or more metrics of a network slice or cell within RAN 109 and/or mobile core network 105. FIG. 1C, discussed below, provides an example wherein near-RT RIC 124 includes metrics prediction 160B, which predict one or more metrics of a network slice or cell within RAN 109 and/or mobile core network 105.

FIG. 1B is a block diagram illustrating further example details of the non-RT RIC 122 of FIG. 1A. In the example illustrated in FIG. 1B, SMO 112 may include non-RT RIC 122, one or more AI/ML models 142, one or more functions 144 (e.g., NSSMF, NFMF, and other functions), and open interfaces, such as O1 termination interface 168 and O2 termination interface 169. SMO 112 may manage non-RT RIC 122, near-RT RIC 124, O-RAN managed elements (e.g., centralized unit (O-CU) 146, O-RAN decentralized unit (O-DU) 148 of one or more base stations), and resources in O-RAN cloud 150.

Non-RT RIC 122 may provide non-real-time (e.g., greater than one second) control and optimization of RAN elements and resources such as RUs, DUs, and CUs, workflow management, and policy-based control of applications and features of near-RT RIC 124. Non-RT RIC 122 may be deployed as a highly scalable, microservices based containerized architecture. In this example, non-RT RIC 122 may onboard, deploy, and/or terminate one or more applications, e.g., rApp 123A through rApp 123N (collectively "applications 123"). Applications 123 may represent applications that leverage the functionality exposed via the framework of non-RT RIC 122. Applications 123 may provide non-RT RIC 122 with non-real time (e.g., greater than one second) control of RAN elements and their resources. Applications 123 may provide services for radio resource management, higher layer procedure optimization, policy optimization, and providing guidance, parameters, policies, and AI/ML models to support the operation of RAN functions.

For example, applications 123 may provide A1 services that provide and facilitate RAN operations and optimization of near-RT RIC 124, such as providing operational guidance (e.g., policies), enrichment information (e.g., forecasts), and AI/ML services. A1 services may include policy management services such as creating, updating, and/or deleting of A1 policies; receiving policy feedback; querying policy types, identifiers, and status; defining which policy types are supported by near-RT RIC 124; and registering applications (xApps) of near-RT RIC 124 to specific policy types. A1 services may include enrichment information services, such as providing data for model training of AI/ML models, such as forecasts and/or data analytics.

Applications 123 may provide O1 services that provide configuration management or performance management of O-RAN managed entities, such as near-RT RIC 124 and/or RAN nodes, e.g., O-CU 146, O-DU 148 (also referred to herein as "E2 nodes"). O1 services may provide configuration management services to create, update, and/or delete configurations to O-RAN managed entities. For example, configuration management services may include provisioning operations (e.g., for NSS and NF provisioning) to create a managed object instance (MOI), obtain MOI attributes, modify MOI attributes, and/or delete the MOI. O1 services may also provide performance management services that monitor the status of elements or components in the O-RAN managed entities. For example, non-RT RIC 122 may create, modify, or delete performance management jobs to receive performance metrics, or send heartbeat messages to monitor the status and/or availability of services of RAN nodes or to send trace messages to monitor link failures. O1 services may also provide file management, such as to push files to the RAN nodes (e.g., software updates, beamforming configuration files, ML models, security certificates, etc.).

Applications 123 may provide O2 services that provide infrastructure management and/or network function deployment of resources in O-RAN cloud 150 (also referred to herein as "O-Cloud 150"). O2 services may provide discovery and administration of O-Cloud resources; Scale-In, Scale-Out of cloud/deployments (e.g., deploying resources with more or less processors); FCAPS of cloud/deployments, software management of cloud platform/deployments; create/delete deployment and associated allocated O-Cloud resources.

Applications 123 may provide service management and exposure (SME) services, data management and exposure (DME) services, and/or other services. SME services may provide services that enable services provided over an internal interface (R1 interface 154) of non-RT RIC 122 and their exposure and extensibility through services including bootstrap, service registration/deregistration or updates to service registration, service discovery or notification, heartbeat, authentication, authorization, etc. Data management and exposure (DME) services may include services that manage data and their exposure between applications 123. For example, applications 123 may have different functions, such as application 123A configured to collect and analyze data, application 123B configured to generate an ML model based on the results of the analysis, and application 123N configured to make a prediction or inference using the ML model and/or to generate controls for RAN nodes based on the prediction or inference. DME services may manage the data shared between applications 123, such as the collection of data, the processing of the data, and/or the advertisement of the data.

Non-RT RIC 122 may include one or more managers to process the A1, O1, O2, SME, DME services, and other services. For example, non-RT RIC 122 may include a policy manager 158, O1 services manager 160, O2 services manager 162, service manager 163, and data manager 155. Non-RT RIC 122 may include other managers, such as an application manager and an application on-boarder, that are configured to manage the installation and deployment of applications 123.

Policy manager 158 is configured to control the deployment of policies (e.g., A1 services). For example, in response to receiving requests for A1 services from applications 123 via R1 interface 154, R1 interface 154 sends the requests to policy manager 158 via message bus 151. Policy manager 158 may process the A1 services and may send the A1 services to A1 termination 156 via message bus 151, which provides the A1 services to near-RT RIC 124 via A1 interface 164. In some examples, the A1 interface may implement an A1AP application protocol based on the O-RAN specifications.

O1 services manager 160 is configured to control the deployment of O1 services for monitoring the performance of near-RT RIC 124 and/or RAN nodes (e.g., O-CU 146, O-DU 148). For example, in response to receiving requests for O1 services for monitoring the performance of near-RT RIC 124 from applications 123 via R1 interface 154, R1 interface 154 sends the requests to O1 services manager 160 via message bus 151. O1 services manager 160 may process the O1 services and may send the O1 services to O1 termination 168, which provides the O1 services to near-RT RIC 124 via O1 interface 166. In some examples, the O1 interface may implement REST/HTTPS APIs and/or NET-CONF.

O1 services manager 160 is additionally, or alternatively, configured to control the deployment of O1 services for the configuration of near-RT RIC 124 and/or RAN nodes. For example, in response to receiving requests for O1 services for the configuration of near-RT RIC 124 from applications 123 via R1 interface 154, R1 interface 154 sends the requests to O1 services manager 160. O1 services manager 160 may process the O1 services and may send the O1 services to O1 termination 168, which provides the O1 services to near-RT RIC 124 via O1 interface 166.

O2 services manager 162 may be configured to control the deployment of O2 services for monitoring the performance of resources of O-Cloud 150. For example, in response to receiving requests for O2 services for monitoring the performance of resources within O-Cloud 150 via R1 interface 154, R1 interface 154 sends the request to O2 services manager 162. O2 services manager 162 may process the O2 services and may send the O2 services to O2 termination 169, which provides the O2 services to resources of O-Cloud 150 via O2 interface 167.

O2 services manager 162 may additionally, or alternatively, be configured to control the deployment of O2 services for the configuration of resources of O-Cloud 150. For example, in response to receiving requests for O2 services for configuring resources within O-Cloud 150 from applications 123 via R1 interface 154, R1 interface 154 sends the requests to O2 services manager 162. O2 services manager 162 may process the O2 services and may send the O2 services to O2 termination 169, which provides the O2 services to resources of O-Cloud 150 via O2 interface 167.

In some examples, R1 interface 154 also exposes applications 123 to SME services, DME services, and/or other services. For example, in response to receiving requests for SME services from applications 123 via R1 interface 154, R1 interface 154 sends the requests to service manager 163. Service manager 163 may process the SME services (e.g., register/update a service) and may send the SME services to R1 termination 152, which provides the SME services to applications 123 via R1 interface 154 (e.g., sending response to application regarding service registration, update, or discovery). Similarly, in response to receiving requests for DME services from applications 123 via R1 interface 154, R1 interface 154 sends the requests to data manager 155. Data manager 155 may process the DME services and may send the DME services to R1 termination 152, which provides the DME services to applications 123 via R1 interface 154 (e.g., sending data from application configured as a data producer to application configured as a data consumer).

R1 interface 154 may also expose applications 123 to slice subnet management services, such as RAN NSSMF interfaces to retrieve slice service level agreements (SLAs) and slice topologies, and/or slice management, SLA, and slice performance management notifications to applications 123.

In accordance with the techniques of the disclosure, applications 123 of non-RT RIC 122 include metrics prediction unit 160A. In this example, metrics prediction unit 160A is executed as an rApp (e.g., rApp 123A). Metrics prediction 160A receives respective datasets for cells or network slices of a mobile network that includes O-CUs 146 and O-DUs 148, which implement one or more cells or network slices for the mobile network. Each dataset comprises time steps and respective values for a performance metric of the corresponding one of the cells or network slices. Metrics prediction 160A groups, based on a clustering algorithm applied to at least one of (1) the datasets, or (2) the cells or network slices, the datasets into clusters of datasets. Metrics prediction 160A obtains a subset of most-recent time steps (e.g., a "sliding window" including 'N' most-recent steps, wherein N is an integer) and corresponding values of each dataset of the datasets of a first cluster of the clusters. Metrics prediction 160A applies, to the subset, a transformation to obtain a set of time steps and corresponding standardized values. Metrics prediction 160A trains, with the set of time steps and corresponding standardized values for each dataset of the datasets of the first cluster, a machine learning system (not depicted in FIG. 1B) to generate predicted values at future time steps of the datasets of the first cluster.

Subsequently, metrics prediction 160A receives a first dataset for a first cell or network slice of the cells or network slices of the mobile network. The trained machine learning system of metrics prediction 160A processes the first dataset to generate a first predicted value at a first future time step of the first dataset. Non-RT RIC 122 modifies an allocation of a resource of the mobile network for the first cell or network slice based at least in part on the first predicted value at the first future time step.

FIG. 1C is a block diagram illustrating further example details of the Near-RT RIC of FIG. 1A. In the example illustrated in FIG. 1C, near-RT RIC 124 includes shared data layer 188, database 189, one or more AI/ML models 190, managers 191, xApp subscription manager 192, messaging infrastructure 193, conflict mitigation 194, security 195, xApp repository 196, message bus 187, API enablement

197, and open interfaces, such as O1 termination 185, A1 termination 186, Y1 termination 198, and E2 termination 199.

Near-RT RIC 124 can provide near-real-time (e.g., milliseconds) control and optimization of RAN elements and resources, such as O-CU 146 and/or O-DU 148, via fine-grained data collection and actions performed via E2 interface 199. For example, near-RT RIC 124 may onboard one or more applications 125 (e.g., xApps 125A-125N of FIG. 1C, collectively, "xApps 125") that provide near-real time control of RAN elements and their resources.

Near-RT RIC 124 may be deployed as a highly scalable, microservices based containerized architecture. Near-RT RIC 124 may onboard one or more applications, e.g., applications 125 (e.g., xApps 125) that manage near-real time events within near-RT RIC 124. Applications 125 may leverage the functionality exposed via the near-RT RIC framework of near-RT RIC 124. Near-RT RIC 124 may enforce policies received from applications 123 of non-RT RIC 122 and may provide policy feedback to non-RT RIC 122. Although illustrated as within near-RT RIC 124, any one or more of applications 125 may be executed by a third party, separate from near-RT RIC 124.

Shared Data Layer 188 and database 189 enable near-RT RIC 124 to maintain and expose RAN/UE information and other information required to support specific use cases. In some examples, database 189 maintains a list of UEs and associated data, and perform tracking and correlation of the UE identities associated with the connected E2 Nodes. In some examples, database 189 maintains configurations and near real-time information relating to connected E2 Nodes and the mappings between them. In some examples, Shared Data Layer 188 and database 189. Such information may be generated and accessed by near-RT RIC 124 or authorized xApps 125. Shared Data Layer 188 provides SDL services for xApps 125, which can be used to subscribe to database notifications and to read, write and modify information stored on database 189. Use-case specific information may be exposed using the services provided by Shared Data Layer 188.

Managers 191 include OAM management, which provides fault, configuration, accounting, performance, file, security and other management plane services. Managers 191 of near-RT RIC 124 provide several capabilities to support OAM management services. For example, managers 191 provide fault management, including Near-RT RIC Fault Supervision MnS over the O1 interface. Further, managers 191 provide configuration management, including Near-RT RIC Provisioning MnS over the O1 interface.

In some examples, managers 191 perform logging, tracing, and metrics collection functions. Logging is to capture information needed to operate, troubleshoot and report on the performance of near-RT RIC 124 and its constituent components. Log records may be viewed and consumed directly by users and systems, indexed and loaded into a data storage, and used to compute metrics and generate reports. Near-RT RIC components log events according to a common logging format. Different logs can be generated (e.g., audit log, metrics log, error log and debug log). Tracing mechanisms are used to monitor the transactions or a workflow. An example subscription workflow can be broken into two traces namely, a subscription request trace followed by a response trace. Individual traces can be analyzed to understand timing latencies as the workflow traverses a particular Near-RT RIC component. Metrics are collected and reported for performance and fault management specific to each xApp logic and other internal functionalities are collected and published for authorized consumer (e.g., SMO).

Near-RT RIC 124 includes xApp subscription manager 192. xApp subscription manager 192 enables near-RT RIC 124 to handle subscription requests from different xApps 125 for, e.g., E2-related data, and provides unified data distribution to xApps 125 for those data. xApp subscription manager 192, in some examples, manages subscriptions from xApps to E2 nodes. xApp subscription manager 192 may enforce authorization of policies controlling xApp 125 access to messages. Further, xApp subscription manager 192 enables merging of identical subscriptions from different xApps 125 into a single subscription toward an E2 Node.

Conflict mitigation 194 enables near-RT RIC 124 to detect and resolve potentially overlapping or conflicting requests from multiple xApps 125. In the context of near-RT RIC 124, conflict mitigation 194 addresses conflicting interactions between different xApps 125. An application may change one or more parameters with the objective of optimizing a specific metric. Conflict mitigation 194 may reduce, mitigate, or avoid instances wherein xApps 125 chose or configure objectives such that they result in conflicting actions.

Messaging infrastructure 193 enables near-RT RIC 124 with low-latency message delivery between Near-RT RIC internal endpoints. Messaging infrastructure 193 supports registration of endpoints, wherein endpoints register themselves to messaging infrastructure 193. Messaging infrastructure 193 further supports discovery of endpoints, wherein endpoints are discovered by messaging infrastructure 193 initially and registered to messaging infrastructure 193. Messaging infrastructure 193 also supports deletion of endpoints, wherein endpoints are deleted once they are not used anymore. Messaging infrastructure 193 may provide an API for sending messages to messaging infrastructure 193 and an API for receiving messages from messaging infrastructure 193. Messaging infrastructure 193 supports multiple messaging modes, e.g., point-to-point mode (e.g., message exchange among endpoints), publish/subscribe mode (e.g., real-time data dispatching from E2 termination 199 to multiple subscriber xApps 125). Messaging infrastructure 193 provides message routing, namely according to the message routing information, messages can be dispatched to different endpoints. Messaging infrastructure 193 supports message robustness to avoid data loss during a messaging infrastructure outage/restart or to release resources from the messaging infrastructure once a message is outdated.

Near-RT RIC 124 includes security 195. Security 195 prevent malicious xApps 125 from abusing radio network information (e.g., exporting to unauthorized external systems) and/or control capabilities over RAN functions.

Near-RT RIC 124 includes termination for various interfaces, including E2 termination 199, A1 termination 186, O1 termination 185, and Y1 termination 198. E2 termination 199 enables termination of an E2 interface. E2 termination 199 may terminate an SCTP connection from each E2 Node. E2 termination 199 may also route messages from xApps 125 through the SCTP connection to an E2 Node. E2 termination 199 may further decode the payload of an incoming ASN.1 message enough to determine message type. In some examples, E2 termination 199 handles incoming E2 messages related to E2 connectivity and receives and responds to an E2 Setup Request from an E2 Node. Furthermore, E2 termination 199 may notify xApps 125 of a list of RAN functions supported by an E2 Node based on information derived from the E2 Setup and RIC Service Update procedures, and may notify the newly connected E2 Node of the list of accepted functions.

A1 termination 186 enables termination of the A1 interface. A1 termination 186 provides a generic API by means of which Near-RT RIC 124 can receive and send messages via an A1 interface. These include, e.g., A1 policies and enrichment information received from Non-RT RIC 122, or A1 policy feedback sent towards Non-RT RIC 122. A1 termination 186 may further send an A1 policy that is set or updated by Non-RT RIC 122 to suitable xApp(s) 125 based on a list of candidate xApps 125 provided by xApp Repository 196.

O1 termination 185 enables termination of the O1 interface. Near-RT RIC 124 communicates with SMO 112 via O1 interface 166 and exposes O1-related management services from Near-RT RIC 124. For O1 management services (MnS), near-RT RIC 124 is an MnS producer and SMO 112 is an MnS consumer. Near-RT RIC 124 exposes provisioning management services from Near-RT RIC 124 to an O1 provisioning management service consumer, translates O1 management services to internal APIs of near-RT RIC 124, exposing FM services to report faults and events from near-RT RIC 124 to an O1 FM service consumer, exposes PM services to report bulk and real-time PM data from near-RT RIC 124 to an O1 PM service consumer, exposes file management services to download ML files, software files, etc. and upload log/trace files to/from file MnS consumer, and exposes communication surveillance services to the O1 communication surveillance service consumer.

Y1 termination 198 enables termination of the Y1 interface. Y1 termination 198 provides support for exposing RAN analytics information from Near-RT RIC 124 to Y1 consumers.

Near-RT RIC 124 may include one or more managers to process the O1, A1, Y1, and E2 services, and other services. Near-RT RIC 124 may include other managers, such as an application manager and an application on-boarder, that are configured to manage the installation and deployment of applications 125.

API enablement 197 provide APIS for near-RT RIC 124. The near-RT RIC APIs can be categorized based on the interaction with near-RT RIC 124 and can be related to E2-related services, A1-related services, Management related services, and SDL services. This functionality provides support for registration, discovery and consumption of near-RT RIC APIs within the near-RT RIC scope. In particular, API enablement 197 provides services including repository and registry services for near-RT RIC APIs, services that allow discovery of the registered near-RT RIC APIs, services to authenticate xApps 125 for use of the near-RT RIC APIs, services that enable generic subscription and event notification, and functionality to avoid compatibility clashes between xApps 125 and the services they access. In some examples, API enablement 197 provides API enablement services that are accessed by xApps 125 via one or more enablement APIs.

AI/ML models 190 enables near-RT RIC 124 with data pipelining, model management, training and inference, which constitute complete AI/ML workflow support for xApps 125 to implement AI/ML algorithms. xApps 125 may use none, part, or all of this functionality, depending on its design. In some examples, AI/ML models 190 include data pipelining, which performs data ingestion and preparation for xApps 125. AI/ML models 190 may provide generic and use case-independent capabilities to AI/ML-based xApps 125 that may be useful to multiple use cases. The input data for training may come from an xApp-specific space (e.g., dedicated space in database).

xApp Repository 196 maintaining a list of candidate xApp(s) to A1 Termination 186 for sending A1 policy or policy update to suitable xApp(s) 125 based on policy type and operator policies. In addition, xApp Repository 196 maintains the policy types supported in near-RT RIC 124. The supported policy types are based on policy types supported by the registered xApps 125 and operator policies. Further, xApp Repository 196 performs xApp access control to requested A1-EI type based on operator policies.

In accordance with the techniques of the disclosure, applications 125 of near-RT RIC 124 include metrics prediction unit 160B. In this example, metrics prediction unit 160B is executed as an xApp (e.g., xApp 125A). Metrics prediction 160B receives respective datasets for cells or network slices of a mobile network that includes O-CUs 146 and O-DUs 148, which implement one or more cells or network slices for the mobile network. Each dataset comprises time steps and respective values for a performance metric of the corresponding one of the cells or network slices. Metrics prediction 160B groups, based on a clustering algorithm applied to at least one of (1) the datasets, or (2) the cells or network slices, the datasets into clusters of datasets. Metrics prediction 160B obtains a subset of most-recent time steps (e.g., a "sliding window" including 'N' most-recent steps, wherein Nis an integer) and corresponding values of each dataset of the datasets of a first cluster of the clusters. Metrics prediction 160B applies, to the subset, a transformation to obtain a set of time steps and corresponding standardized values. Metrics prediction 160B trains, with the set of time steps and corresponding standardized values for each dataset of the datasets of the first cluster, a machine learning system (not depicted in FIG. 1B) to generate predicted values at future time steps of the datasets of the first cluster.

Subsequently, metrics prediction 160B receives a first dataset for a first cell or network slice of the cells or network slices of the mobile network. The trained machine learning system of metrics prediction 160B processes the first dataset to generate a first predicted value at a first future time step of the first dataset. Near-RT RIC 124 modifies an allocation of a resource of the mobile network for the first cell or network slice based at least in part on the first predicted value at the first future time step.

AI/ML approaches are very suitable for ingesting performance metrics sent by rApps 123 of FIG. 1B and xApps 125 of FIG. 1C, processing the metrics, and determining reconfiguration of resources to each slice or cell. Based on historical traffic patterns of each slice or cell, a system as described herein uses ML techniques to forecast the future traffic patterns of each slice or cell. These forecasts help rApps 123 of FIG. 1B and xApps 125 of FIG. 1C to allocate sufficient resources to each slice or cell, as well as activate or deactivate each slice or cell to meet the future network demands.

A naïve baseline approach would be to train a forecasting model per-slice, per-cell, for each key performance indicator (KPI) to forecast the network demands. However, this may be infeasible because there are very large number of slices and cells in the network, which as mentioned above, can be provisioned and deprovisioned dynamically. Therefore, designing a separate forecasting model per-slice or per-cell is infeasible due to scalability and maintainability issues, as the number of slices and cells are usually in range of hundreds of thousands. Further, dynamic activation or deactivation of slices may demand a new forecasting model whenever a new slice or cell is activated. When a new forecasting model is created, there may be significant latency in obtaining an initial forecast because a large amount of past data is required for training, and a previous 'n' steps may be needed for inference. This may lead to degradation in the performance of such a system using the naïve approach. In addition, designing a separate forecasting model for each KPI for every slice or cell may require a separate forecasting model, which would result in heavy load on rApps 123 of FIG. 1B and xApps 125 of FIG. 1C for managing and maintaining a huge scale system.

Therefore, in accordance with the techniques disclosed herein, a cloud-based, model-efficient AI/ML framework is proposed that sits inside rApp 123A (or xApp 125A) and helps efficiently manage slices and cells for multiple use cases (KPIs), resolving the above-mentioned challenges.

A system as described herein creates a model for forecasting one or more metrics of a network slice or cell. Further, such a model is generic to many different network slices or cells across the network system. Such as system uses the following hyperparameters:

M: Number of clusters to make of N present time series n_steps: Number of past time steps to consider Based on statistical/entropy based distance of probability distribution of time series, the system creates M clusters of time series, merges the data of multiple slices or cells for one or more KPIs in a same cluster with a defined confidence interval. The system creates a feature space by segmenting the data into intervals of size 'n_steps'. The system may then standardize each segment of size 'n_steps' of time series. Given $X=(x1, x2, \ldots, Xn\_steps)$ and y $Xn\_steps+1$, the system standardizes the segments as follows:

$$\hat{X} = \left( \frac{x_1 - \mu(X)}{\sigma(X)}, \frac{x_2 - \mu(X)}{\sigma(X)}, \ldots, \frac{x_{n\_steps} - \mu(X)}{\sigma(X)} \right)$$

$$\hat{y} = \frac{y - \mu(X)}{\sigma(X)}$$

FIG. 2 is a block diagram illustrating example data sets for training a machine learning system in accordance with the techniques of this disclosure. Chart 202 depicts a downlink throughput of N cells. Chart 204 depicts a merged training dataset with feature space having "n_steps"=13 for similar cells. Chart 206 depicts a scaled windowed training dataset.

Algorithm 1, set forth below, depicts an algorithm for training dataset curation for cluster-based models. In some examples, Algorithm 1 may be applied to the data set of chart 202 of FIG. 2 to generate the scaled windowed training dataset of chart 206 of FIG. 2.

---

Algorithm 1: Training Dataset curation for Cluster-based Models

---

Require: Time series of PMs of N slices or cells $(T_1, T_2,..., T_N)$, No. of clusters (M), No. of past time steps to consider $(n_{steps})$.

Ensure: Scaled windowed training dataset (X, y) where $X \in \mathbb{R}^{t \times n_{steps}}$, $y \in \mathbb{R}^t$ for M clusters of cells / slices.

-continued

---

Algorithm 1: Training Dataset curation for Cluster-based Models

---

1: Cluster time series of PMs of slices or cells based on distance metrics such as DTW,
   Euclidean, etc.
   $C_1, C_2,..., C_M \leftarrow$ ClusteringAlgo($T_1, T_2,..., T_N$)
2: for each cluster c, $1 \le c \le M$ do
3:      $\mathcal{D}_c \leftarrow$ Cluster-level training dataset
4:      for each cell/slice i in $C_c$ do 5:          Create cell/slice-level training dataset based on past $n_{steps}$
            $\mathcal{D}_i = \{(X_{i,t}, y_{i,t}) \ \forall t \in (n_{steps}, len(T_i)\}$
            $X_{i,t} \leftarrow (T_{i,t-n_{steps}}, T_{i,t-n_{steps}+1}, ..., T_{i,t-1}),$    $n_{steps} < t \le len(T_i)$
            $y_{i,t} \leftarrow T_{i,t},$                                          $n_{steps} < t \le len(T_i)$
6:          Add cell/slice-level training dataset to cluster-level training dataset
            $\mathcal{D}_c \leftarrow \mathcal{D}_c \cup \mathcal{D}_i$
7:      end for
8:      Standardize each element $(X_i, y_i)$ of $\mathcal{D}_c$ individually $$\hat{X}_i = \left( \frac{x_1 - \mu(X_i)}{\sigma(X_i)}, \frac{x_2 - \mu(X_i)}{\sigma(X_i)}, ..., \frac{x_{n_{steps}} - \mu(X_i)}{\sigma(X_i)} \right), \quad 1 \le i \le len(\mathcal{D}_c)$$

$$\hat{y}_i = \frac{y_i - \mu(X_i)}{\sigma(X_i)}, \quad\quad\quad\quad\quad 1 \le i \le len(\mathcal{D}_c)$$

9: end for
10: return   Cluster-level training dataset for M clusters $[\mathcal{D}_1, \mathcal{D}_2,..., \mathcal{D}_M]$

---

Algorithm 1 depicts pseudocode for training dataset curation for cluster-based models with M clusters. This pseudocode works for uni-model approaches (assuming the number of clusters to be 1) as well as for multi-model approaches. A uni-model approach attempts to forecast a future value of KPIs of multiple cells or slices using only one ML model. A multiple-model (or "multi-model") approach attempts to forecast future values of KPIs of multiple cells or slices, categorizing them in M clusters (wherein M is greater than 1), and training a model for each cluster.

Figure 3:
FIG. 3 is a block diagram illustrating example usage of a sliding window for feature generation in accordance with the techniques of this disclosure.

FIG. 3 is a block diagram illustrating example usage of a sliding window 300 for feature generation in accordance with the techniques of this disclosure. To develop a ML-based model, including the model-efficient framework for a network slice or cell described herein, training data is required. A historical time series of different cell-level or slice-level PMs is used to create a common prediction model. As additional features, geographical location data of the cell, such as latitude, longitude, and azimuth, may optionally be used.

The forecasting problem can be devised as a regression problem. To create the feature space, one uses past 'n' time steps (n_steps) from the time series of a PM. To add location data, one encodes the location data using One-Hot/Binary/Frequency encoding. To decide the 'n_steps', one uses statistical techniques such as autocorrelation function (ACF), partial autocorrelation function (PACF), and/or seasonal decomposition.

The techniques of the disclosure may use numerous different modelling methodologies. As one example, a system in accordance with the techniques of the disclosure, such as non-RT RIC 122 or near-RT RIC 124, may use a baseline model. In this example, non-RT RIC 122 or near-RT RIC 124 trains a different forecasting model for every slice or cell on a per-slice or per-cell basis to predict a future time step of a metric. The advantage of this modeling methodology is that enhanced results may be obtained over other methodologies. However, there are numerous disadvantages, which may include the challenge of training a model with less data, scalability and maintainability issues, and the unfeasibility of forecasting for newly activated cells without any previous data. One may use this approach as a baseline model for comparing the performance of other approaches.

Figure 4:
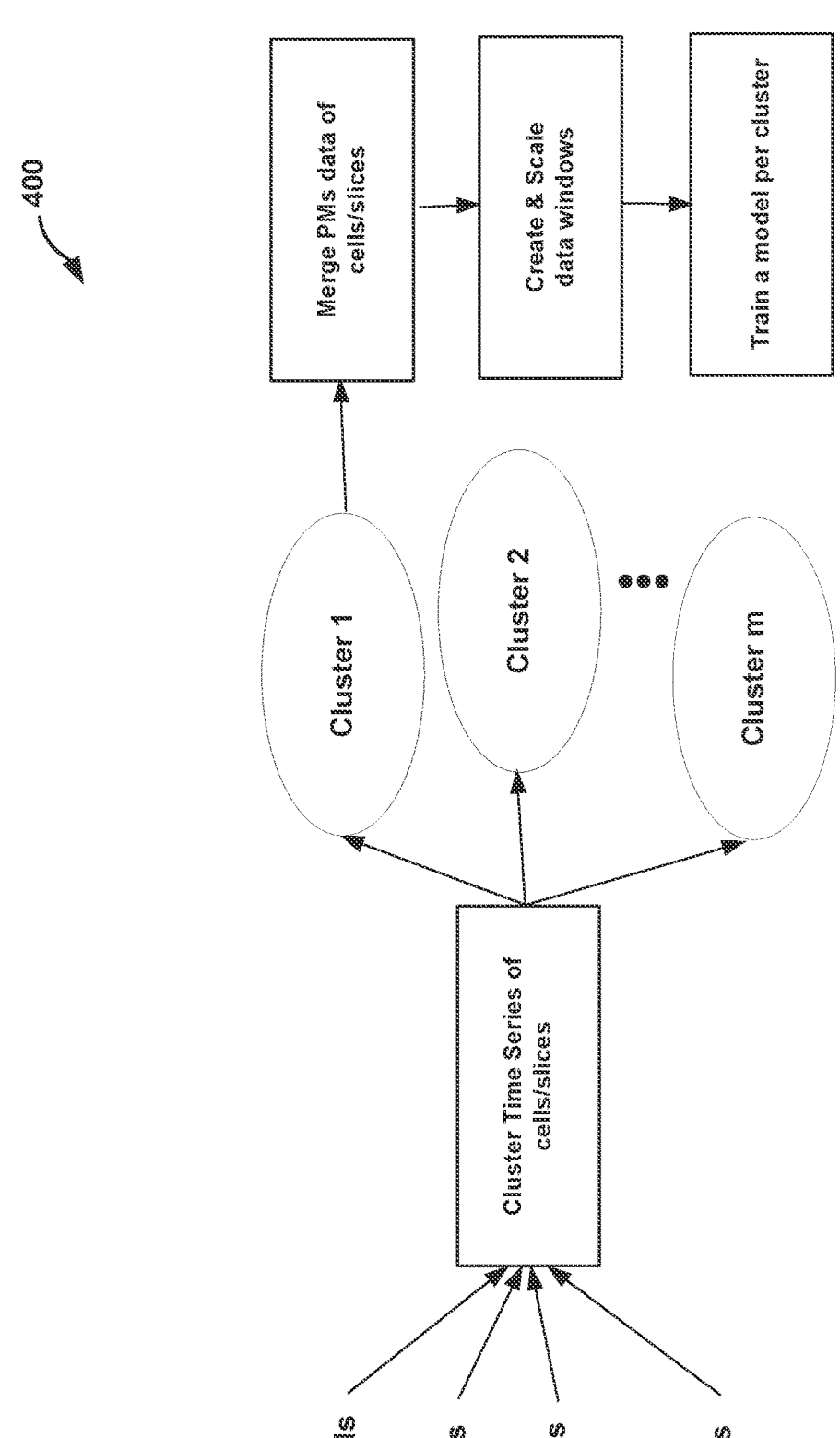
FIG. 4 is a block diagram illustrating an example architecture for a cluster-based machine learning model in accordance with the techniques of this disclosure.

FIG. 4 is a block diagram illustrating an example architecture 400 for a cluster-based machine learning model in accordance with the techniques of this disclosure. As discussed above, the techniques of the disclosure may use numerous different modelling methodologies to train a forecasting model per-slice or per-cell. In the example of FIG. 4, non-RT RIC 122 or near-RT RIC 124 of FIGS. 1A-1C implement a cluster-based model to train a forecasting model to predict a future time step of a metric for a slice or cell. In some examples, non-RT RIC 122 or near-RT RIC 124 may cluster slices or cells according to a time series of a PM. In some examples, non-RT RIC 122 or near-RT RIC 124 use KMeans clustering with Euclidean distance and dynamic time warping (DTW) as the distance metric.

In some examples, non-RT RIC 122 or near-RT RIC 124 may cluster cells according to geographical location (e.g., Latitude, Longitude). In some examples, non-RT RIC 122 or near-RT RIC 124 use KMeans clustering, Agglomerative Hierarchical clustering using Haversine (Great-Circle) distance, or based on exact location. In some examples, non-RT RIC 122 or near-RT RIC 124 may cluster cells according to a NodeID of each cell. In some examples, non-RT RIC 122 or near-RT RIC 124 may cluster cells based on an exact NodeID of each cell.

In another example, non-RT RIC 122 or near-RT RIC 124 of FIGS. 1A-1C implement a uni-model to train a forecasting model to predict a future time step of a metric for a slice or cell. In this example, non-RT RIC 122 or near-RT RIC 124 train a different prediction model (e.g., a common prediction model for each cell or slice within a cluster) for each cluster. In this example, non-RT RIC 122 or near-RT RIC 124 performs the following training steps: create a feature space by segmenting the data into intervals of size 'n_steps' (e.g., a sliding window size); standardize the sliding window data; store data artifacts for post processing (which optionally may occur only during inference); and train a classical ML or DL model with the standardized sliding window data. Other features can even be added to the feature space such as location data (for cell), non-linear features such as fast Fourier transform (FFT), standard deviation, polynomial features, etc., and/or other PMs having high correlation to the desired PM.

In still another example, non-RT RIC 122 or near-RT RIC 124 of FIGS. 1A-1C implement a uni-model with data engineering to train a forecasting model to predict a future time step of a metric for a slice or cell. In this example, non-RT RIC 122 or near-RT RIC 124 train a different prediction model (e.g., a common prediction model for each cell or slice within a cluster) for each cluster. In this example, non-RT RIC 122 or near-RT RIC 124 performs the following training steps. First, non-RT RIC 122 or near-RT RIC 124 create a feature space by segmenting the data into intervals of size 'n_steps'. next, non-RT RIC 122 or near-RT RIC 124 standardize the segments of size 'n_steps'. One row of training data is X=(X1, X2, . . . , Xn_steps) and y=Xn_steps+1.

$$\left( \frac{x_1 - \mu(X)}{\sigma(X)}, \frac{x_2 - \mu(X)}{\sigma(X)}, \dots, \frac{x_{n\_steps} - \mu(X)}{\sigma(X)} \right)$$

$$\hat{y} = \frac{x_{n\_steps+1} - \mu(X)}{\sigma(X)}$$

Further, non-RT RIC 122 or near-RT RIC 124 train a classical ML or DL model. In some examples, one may add location data to the feature space.

The techniques disclosed herein may provide numerous advantages over conventional methods for training machine learning systems to predict a future value of a metric for a network system. For example, a system as described herein may provide a scalable AI/ML solution that uses model-efficient framework (e.g., a common prediction model for slices or cells for one or more KPIs), which makes such a system highly scalable, maintainable, and lightweight. Further, a system as described herein may enable rapid experimentation by providing for the easy modification of pipelines for different networking related use cases, thereby allowing application development, rapid deployment and performance monitoring on a new use case. A system as described herein may additionally provide increased diversity and fidelity because such the model efficient framework described herein is customizable to manage different types of slices or cells, and the techniques described herein produce competitive results against naïve individual prediction models.

In some examples, a system as described herein may implement dynamic slices and cells. For example, non-RT RIC 122 or near-RT RIC 124 may support the introduction of dynamic slices with ML support. Furthermore, non-RT RIC 122 or near-RT RIC 124 may support the dynamic activation or deactivation of cells with ML support.

In some examples, non-RT RIC 122 or near-RT RIC 124, operating as described herein, may reduce latency of system 100. For example, the model-efficient architecture described herein may allow for immediate application of models to dynamic slices and newly activated cell at any instant, thereby reducing performance latency. Furthermore, non-RT RIC 122 or near-RT RIC 124 may increase scalability because the highly-configurable architecture described herein may allow for rapid experimentation for optimization of the algorithm for several other domains and for horizontal and vertical scale testing.

In some examples, non-RT RIC 122 or near-RT RIC 124 may be platform-independent. The implemented architecture is independent of platform deployment and offers both cloud and on-premises solutions. A system as described herein may greatly reduce storage cost and allow for on-demand prediction for dynamically activated or deactivated slices or cells. In some examples, non-RT RIC 122 or near-RT RIC 124 may provide for higher efficiency and cost saving over conventional systems because system 100, as described herein, may use less resources for model training, inference, and maintenance of the model, and further may increase the performance of the overall system by more optimal use of networking resources. In some examples, the system described herein may increase economic utility. For example, non-RT RIC 122 or near-RT RIC 124, operating in accordance with the techniques of the disclosure, may greatly reduce model training and maintenance cost because, instead of training hundreds of thousands of models specific to each slice or cell, a system operating in accordance with the techniques of the disclosure may train only single model or a cluster of models for the whole network to handle multiple use cases.

Figure 5:
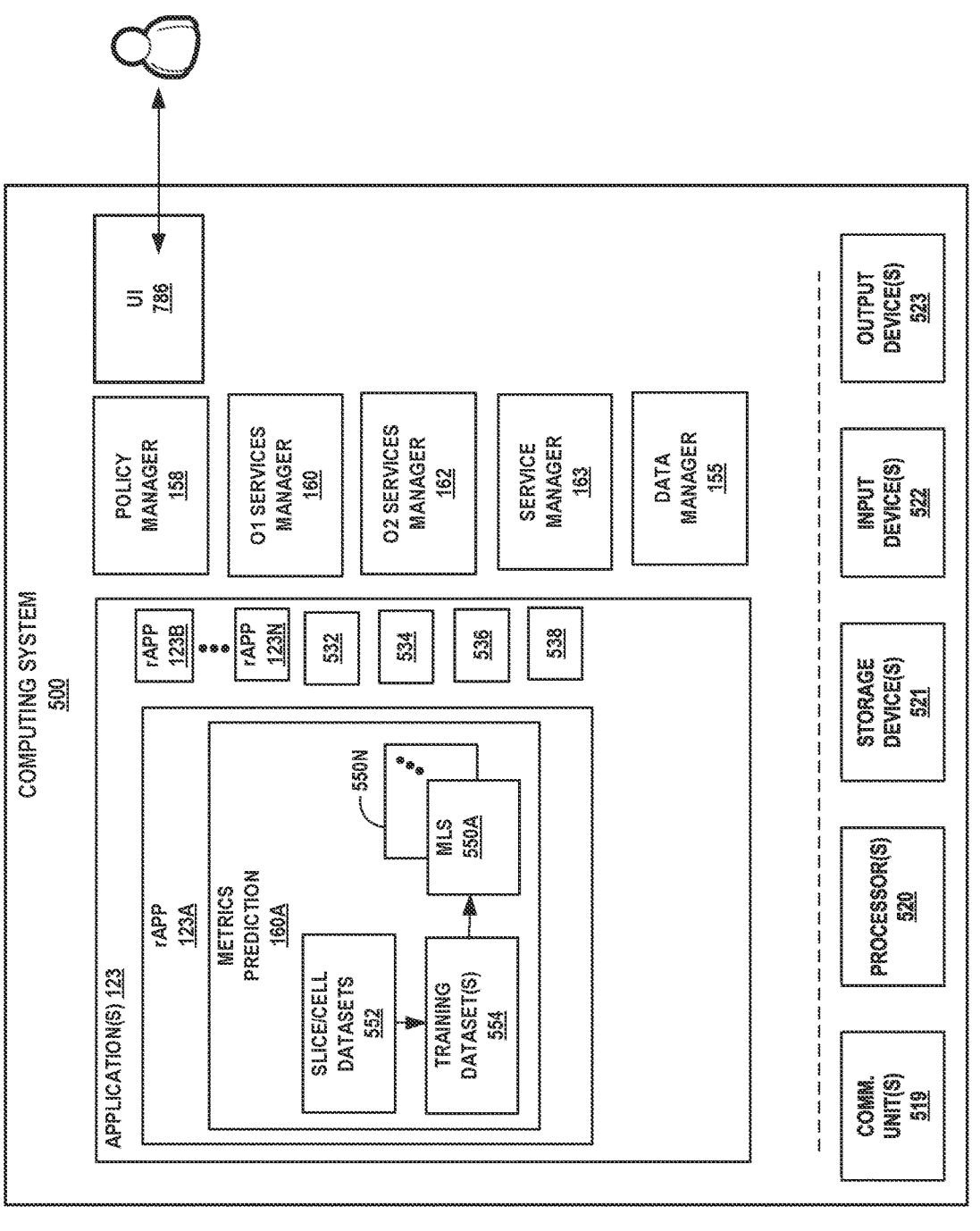
FIG. 5 is a block diagram illustrating an example computing system in detail, in accordance with the techniques of this disclosure.

FIG. 5 is a diagram illustrating example computing system 500 in detail, in accordance with techniques of this disclosure. In this example of FIG. 5, computing system 500 may implement, for example, a non-real time RIC, such as non-RT RIC 122 of FIGS. 1A-1C.

Computing system 500 includes processing circuitry 520, one or more input devices 522, one or more output devices 523, one or more communication units 519, and one or more storage device(s) 521. In some examples, computing system 500 is a cloud computing system, server farm, and/or server cluster (or portion thereof) that provides services to client devices and other devices or systems. In other examples, computing system 500 may be implemented through one or more virtualized compute instances (e.g., virtual machines, containers) of a data center, cloud computing system, server farm, and/or server cluster.

One or more of the devices, modules, storage areas, or other components of computing system 500 may be interconnected to enable inter-component communications (physically, communicatively, and/or operatively). In some examples, such connectivity may be provided by communication channels, a system bus (e.g., message bus 151 of FIG. 1B), a network connection, an inter-process communication data structure, or any other method for communicating data.

Processing circuitry 520 of computing system 500 may implement functionality and/or execute instructions associated with a non-RT RIC or associated with one or more modules illustrated herein and/or described herein, including applications 123, policy manager 158, O1 services manager 160, O2 services manager 162, service manager 163, and data manager 155. Processing circuitry 520 may be, may be part of, and/or may include processing circuitry that performs operations in accordance with one or more aspects of the present disclosure. Examples of processing circuitry 520 include microprocessors, application processors, display controllers, auxiliary processors, one or more sensor hubs, and any other hardware configured to function as a processor, a processing unit, or a processing device. Computing system 500 may use processing circuitry 520 to perform operations in accordance with one or more aspects of the present disclosure using software, hardware, firmware, or a mixture of hardware, software, and firmware residing in and/or executing at computing system 500. Any one or more of applications 123, policy manager 158, O1 services manager 160, O2 services manager 162, service manager 163, and data manager 155 may be hosted by a cloud provider or other third-party.

One or more communication units 519 of computing system 500 may communicate with devices external to computing system 500 by transmitting and/or receiving data, and may operate, in some respects, as both an input device and an output device. In some examples, communication units 519 may communicate with other devices over a network. In other examples, communication units 519 may send and/or receive radio signals on a radio network such as a cellular radio network. In other examples, communication units 519 of computing system 500 may transmit and/or receive satellite signals on a satellite network such as a Global Positioning System (GPS) network. Examples of communication units 519 include a network interface card (e.g., an Ethernet card), an optical transceiver, a radio frequency transceiver, a GPS receiver, or any other type of device that can send and/or receive information. Other examples of communication units 519 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 522 may represent any input devices of computing system 500 not otherwise separately described herein. One or more input devices 522 may generate, receive, and/or process input from any type of device capable of detecting input from a human or machine. For example, one or more input devices 522 may generate, receive, and/or process input in the form of electrical, physical, audio, image, and/or visual input (e.g., peripheral device, keyboard, microphone, camera).

One or more output devices 523 may represent any output devices of computing system 500 not otherwise separately described herein. One or more output devices 523 may generate, receive, and/or process input from any type of device capable of detecting input from a human or machine. For example, one or more output devices 523 may generate, receive, and/or process output in the form of electrical and/or physical output (e.g., peripheral device, actuator).

One or more storage device(s) 521 within computing system 500 may store information for processing during operation of computing system 500. Storage device(s) 521 may store program instructions and/or data associated with one or more of the modules described in accordance with one or more aspects of this disclosure. Processing circuitry 520 and one or more storage device(s) 521 may provide an operating environment or platform for such modules, which may be implemented as software, but may in some examples include any combination of hardware, firmware, and software. Processing circuitry 520 may execute instructions and one or more storage device(s) 521 may store instructions and/or data of one or more modules. The combination of processing circuitry 520 and storage device(s) 521 may retrieve, store, and/or execute the instructions and/or data of one or more applications, modules, or software. Processing circuitry 520 and/or storage device(s) 521 may also be operably coupled to one or more other software and/or hardware components, including, but not limited to, one or more of the components of computing system 500 and/or one or more devices or systems illustrated as being connected to computing system 500.

In some examples, one or more storage device(s) 521 are temporary memories, meaning that a primary purpose of the one or more storage devices is not long-term storage. Storage device(s) 521 of computing system 500 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Storage device(s) 521, in some examples, also include one or more computer-readable storage media. Storage device(s) 521 may be configured to store larger amounts of information than volatile memory. Storage device(s) 521 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

As described above, applications 123 may manage non-real time events within non-RT RIC 122, such as applications that do not require response times of less than one second. Applications 123 may leverage the functionality exposed via a non-RT RIC framework of computing device 500. Applications 123 may be used to control and manage RAN elements and resources, such as a near-RT RIC, RAN nodes, and/or resources in the O-RAN cloud. Applications 123 may provide one or more services that are performed using interfaces of computing system 500 (e.g., A1 interface, O1 interface, O2 interface, etc.). For example, applications 123 may include services such as policies 532 for a near-RT RIC, configuration instructions 534 for O-RAN managed elements, performance jobs 536 for O-RAN managed elements, services for managing the services and/or data 538, etc.

Computing system 500 may include one or more modules or units configured to perform one or more services or functions of applications 123, such as policy manager 158, O1 services manager 160, O2 services manager 162, service manager 163, and data manager 155, as described above.

For example, policy manager 158 is configured to control the deployment of policies (e.g., A1 services). For example, policy manager 158 may receive requests for A1 services from applications 123 (e.g., via R1 interface 154 of FIG. 1B), process the A1 services from applications 123, and perform the A1 services for a near-RT RIC using an A1 interface (e.g., A1 interface 164 of FIG. 1B). In some examples, the A1 interface may implement an A1AP application protocol based on the 3GPP framework.

O1 services manager 160 is configured to control the deployment of O1 services for monitoring the performance of O-RAN managed elements (e.g., near-RT RIC 124, O-CU 146, O-DU 148 of FIG. 1B). For example, O1 services manager 160 may receive requests for O1 services for monitoring the performance of the near-RT RIC from applications 123 (e.g., via R1 interface 154 of FIG. 1B), process the O1 services, and perform the O1 services for the O-RAN managed elements using an O1 interface (e.g., O1 interface 166 of FIG. 1B). In some examples, the O1 interface may implement REST/HTTPS APIs and/or NETCONF.

O1 services manager 160 is additionally, or alternatively, configured to control the deployment of O1 services for the configuration of near-RT RIC 124 and/or RAN nodes. For example, O1 services manager 160 may receive requests for O1 services for the configuration of O-RAN managed elements from applications 123 (e.g., via R1 interface 154 of FIG. 1B), process the O1 services, and may perform the O1 services for the O-RAN managed elements using an O1 interface (e.g., O1 interface 166 of FIG. 1B).

O2 services manager 162 may be configured to control the deployment of O2 services for monitoring the performance of resources of the O-RAN cloud. For example, O2 services manager 162 may receive requests for O2 services for monitoring the performance of resources within the O-RAN cloud (e.g., via R1 interface 154 of FIG. 1B), process the O2 services, and may perform the O2 services for the resources of the O-RAN cloud using an O2 interface (e.g., O2 interface 167 of FIG. 1B).

O2 services manager 162 may additionally, or alternatively, be configured to control the deployment of O2 services for the configuration of resources of the O-RAN cloud. For example, O2 services manager 162 may receive requests for O2 services for configuring resources within the O-RAN cloud from applications 123 (e.g., via R1 interface 154 of FIG. 1B), process the O2 services, and may perform the O2 services for the resources of the O-RAN cloud using an O2 interface (e.g., O2 interface 167 of FIG. 1B).

Service manager 163 is configured to manage services, such as registration of a service, update of a service registration, service discovery, etc. For example, service manager 163 may receive requests for SME services from applications 123 (e.g., via R1 interface 154 of FIG. 1B), perform the SME service (e.g., register/update a service) for one or more applications 123, and send a response to the one or more applications 123 using an R1 interface (e.g., R1 interface 154 of FIG. 1B).

Data manager 155 is configured to manage the data of applications 123. For example, data manager 155 may receive requests for DME services from applications 123 (e.g., via R1 interface 154 of FIG. 1B), perform the DME services (e.g., sending data from application configured as a data producer to application configured as a data consumer) for one or more applications 123, and send a response to the one or more applications 123 using an R1 interface (e.g., R1 interface 154 of FIG. 1B).

In accordance with the techniques of the disclosure, applications 123 include rApp 123A, which executes metrics prediction 160. Metrics prediction 160A predicts one or more metrics of a network slice or cell within RAN 109 and/or mobile core network 105 of FIGS. 1A-1C. In some examples, the one or more metrics are for a network slice within RAN 109 and/or mobile core network 105. In some examples, the one or more metrics are for a network cell within RAN 109 and/or mobile core network 105. Non-RT RIC 122 of FIG. 1B may use the prediction of metrics prediction 160A to adjust or modify the allocation of resources to each network slice or cell within RAN 109 and/or mobile core network 105.

For example, metrics prediction 160A obtains respective datasets 552 for a plurality of cells or network slices within RAN 109 and/or mobile core network 105. Each of datasets 552 comprises time steps and respective values for a performance metric of the corresponding one of the plurality of cells or network slices within RAN 109 and/or mobile core network 105. In some examples, each dataset 522 includes one or more time steps and corresponding values of bandwidth downlink utilization by the corresponding one of the plurality of cells or network slices. In some examples, each dataset 522 includes one or more time steps and corresponding values of a 5th Generation network Key Performance Indicator (5G KPI) for a corresponding one of the plurality of cells or network slices.

Metrics prediction 160A groups, based on a clustering algorithm applied to at least one of (1) the datasets, or (2) the plurality of cells or network slices, datasets 522 into clusters of datasets. In some examples, metrics prediction 160A applies a clustering algorithm to group the plurality of cells or network slices into clusters based at least in part on values of a performance metric for each cell or network slice of the plurality of cells or network slices. In some examples, metrics prediction 160A applies a clustering algorithm to group the plurality of cells or network slices into clusters based at least in part on a geographic location of each cell or network slice of the plurality of cells or network slices. In some examples, metrics prediction 160A applies a clustering algorithm to group the plurality of cells or network slices into clusters based at least in part on a node identifier of each cell or network slice of the plurality of cells or network. Metrics prediction 160A applies, to a subset of most-recent time steps and corresponding values of each dataset of the datasets of a first cluster of the clusters, a transformation to obtain a set of time steps and corresponding standardized values for each cluster.

Metrics prediction 160A uses the set of time steps and corresponding standardized values as training dataset(s) 554 for training machine learning systems 550A-550N (collectively, "machine learning systems 550"). Each machine learning system 550 is trained with respect to a specific cluster of datasets so as to predict future values of one or more metrics of a slice or cell within the cluster. For example, metrics prediction 160A trains, with the set of time steps and corresponding standardized values for each dataset of the training datasets 554 of the first cluster, machine learning system 550A to generate predicted values at future time steps of the datasets 554 of the first cluster. In some examples, machine learning system 550A comprises a first machine learning system that is trained on a set of time steps and corresponding standardized values for a first cluster. In this example, metrics prediction 160A trains, for each different cluster of slices or cells, a different machine learning system with sets of time steps and corresponding standardized values generated from datasets of each respective cluster of the different clusters such that a different machine learning system is trained to generate predicted values at future time steps for the slices or cells of each different cluster.

Subsequently, trained machine learning system 550A processes a first dataset for a first cell or network slice of the plurality of cells or network slices within RAN 109 and/or mobile core network 105 to generate a first predicted value at a first future time step of the first dataset.

In some examples, each dataset 552 for a plurality of cells or network slices within RAN 109 and/or mobile core network 105 comprises a uni-model dataset comprising of a dataset for each cell or network slice within RAN 109 and/or mobile core network 105. In this example, trained machine learning system 550A applies a uni-model approach to generate or predict a value for the future time step of the respective dataset.

In some examples, each dataset 552 for a plurality of cells or network slices within RAN 109 and/or mobile core network 105 comprises a multi-model dataset comprising a dataset for each cluster of cells or network slices within RAN 109 and/or mobile core network 105. In this example, trained machine learning system 550A applies a multi-model approach to generate or predict a value for the future time step of the respective dataset.

In some examples, non-RT RIC 122 modifies, based at least in part on the first predicted value at the first future time step, an allocation of a resource of RAN 109 and/or mobile core network 105 for the first cell or network slice. For example, non-RT RIC 122 may modify a bandwidth allocated to the first cell or network slice. In some examples, computing system 500 outputs, via output devices 523, the first predicted value at the first future time step to another network device, such as near-RT RIC 124, or a user, such as an administrator.

In some examples, non-RT RIC 122 may generate a predicted value at a first future time step for a cell or slice that has been newly- or recently-deployed. A conventional system may have difficulty in generating an accurate prediction of values at a future time for a newly- or recently-deployed cell or slice because such a cell or slice may not have much historical data from which to draw upon for training or analysis by a machine learning system. However, in accordance with the techniques of the disclosure, non-RT RIC 122 may use datasets of other cells or slices within a same cluster as the newly- or recently-deployed cell or slice to train machine learning system 550A such that machine learning system 550A may generate a predicted value at a first future time step for the newly- or recently-deployed cell or slice, even where historical data for the newly- or recently-deployed cell or slice is unavailable. For example, metrics prediction 160A trains, with a set of time steps and corresponding standardized values for each dataset of first datasets of a first cluster, machine learning system 550A. The first datasets do not include a second dataset for a first cell or network slice of the plurality of cells or network slices of RAN 109 and/or mobile core network 105. In some examples, the first cell or network slice has been newly- or recently-deployed. The trained machine learning system 550A generates a first predicted value at a first future time step of the first dataset for the first cell or network slice.

In the example of FIG. 5, metrics prediction 160A is described as implemented by rApps 123 of non-RT RIC 122 of FIGS. 1A-1C. However, in addition or alternatively, the techniques disclosed herein may also be implemented by near-RT RIC 124 of FIGS. 1A-1C. For example, all or a portion of the functionality of metrics prediction 160A may be executed by xApp 124 of near-RT RIC 124 of FIG. 1C.

FIG. 6 is a flowchart illustrating an example operation in accordance with the techniques of this disclosure. FIG. 6 is described with respect to computing system 500 of FIG. 5 for convenience. However, the operation of FIG. 6 may also be performed by non-RT RIC 122 or near-RT RIC 124 of FIGS. 1A-1C.

In accordance with the techniques of the disclosure, metrics prediction 160A predicts one or more metrics of a network slice or cell within RAN 109 and/or mobile core network 105 of FIGS. 1A-1C. In some examples, the one or more metrics are for a network slice within RAN 109 and/or mobile core network 105. In some examples, the one or more metrics are for a network cell within RAN 109 and/or mobile core network 105. Non-RT RIC 122 of FIG. 1B may use the prediction of metrics prediction 160A to adjust or modify the allocation of resources to each network slice or cell within RAN 109 and/or mobile core network 105, as described in the following.

Metrics prediction 160A obtains respective datasets 552 for a plurality of cells or network slices within RAN 109 and/or mobile core network 105 (602). Obtaining a dataset can refer to receiving the dataset and/or generating the dataset from underlying data. Each of datasets 552 comprises time steps and respective values for a performance metric of the corresponding one of the plurality of cells or network slices within RAN 109 and/or mobile core network

105. In some examples, each dataset 522 includes one or more time steps and corresponding values of bandwidth downlink utilization by the corresponding one of the plurality of cells or network slices. In some examples, each dataset 522 includes one or more time steps and corresponding values of a 5th Generation network Key Performance Indicator (5G KPI) for a corresponding one of the plurality of cells or network slices.

Metrics prediction 160A groups, based on a clustering algorithm applied to at least one of (1) the datasets, or (2) the plurality of cells or network slices, datasets 522 into clusters of datasets (604). In some examples, metrics prediction 160A applies a clustering algorithm to group the plurality of cells or network slices into clusters based at least in part on values of a performance metric for each cell or network slice of the plurality of cells or network slices; based at least in part on a geographic location of each cell or network slice of the plurality of cells or network slices; and/or based at least in part on a node identifier of each cell or network slice of the plurality of cells or network. Metrics prediction 160A applies, to a subset of most-recent time steps and corresponding values of each dataset of the datasets of a first cluster of the clusters, a transformation to obtain a set of time steps and corresponding standardized values for each cluster (606).

Metrics prediction 160A uses the set of time steps and corresponding standardized values as training dataset(s) 554 for training a machine learning system 550A specific to a cluster of datasets to predict future values of one or more metrics of a slice or cell within the cluster. For example, metrics prediction 160A trains, with the set of time steps and corresponding standardized values for each dataset of the training datasets 554 of the first cluster, machine learning system 550A to generate predicted values at future time steps of the datasets 554 of the first cluster (608).

Subsequently, trained machine learning system 550A processes a first dataset for a first cell or network slice of the plurality of cells or network slices within RAN 109 and/or mobile core network 105 to generate a first predicted value at a first future time step of the first dataset (610). In some examples, non-RT RIC 122 modifies, based at least in part on the first predicted value at the first future time step, an allocation of a resource of RAN 109 and/or mobile core network 105 for the first cell or network slice (612). For example, non-RT RIC 122 may modify a bandwidth allocated to the first cell or network slice. In some examples, computing system 500 outputs, via output devices 523, the first predicted value at the first future time step to another network device, such as near-RT RIC 124, or a user, such as an administrator.

In some examples, the operations of obtaining (602), grouping (604), applying (608) are performed by the same computing system as that which performs the operations of processing (610) and modifying (612). In other examples, a first computing system performs the operations of obtaining (602), grouping (604), applying (608) to create the trained machine learning system 550A, which is transferred to a second computing system which executes trained machine learning system 550A to perform the operations of processing (610) and modifying (612). In some examples, the operations of obtaining (602), grouping (604), applying (608) are performed at a substantially similar time or in close proximity to a time at which the operations of processing (610) and modifying (612) are performed. In some examples, there may be considerable time between the performance of the operations of obtaining (602), grouping (604), applying (608) and the performance of the operations of processing (610) and modifying (612). Typically, a first computing system is used to train machine learning system 550A. Such a first computing system may belong to, e.g., a developer. Once machine learning system 550A is trained, machine learning system 550A may be sold to, e.g., an end-user such as a mobile network administrator or operator. A second computing system belonging to the end-user may execute trained machine learning system 550A to perform the task for which machine learning system 550A has been trained, e.g., to predict resource usage by cells or network slices of a mobile network.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A computing system comprising processing circuitry having access to a memory, the processing circuitry configured to:

obtain respective datasets for a plurality of cells or network slices of a mobile network, each dataset of the datasets comprising time steps and respective values for a performance metric of the corresponding one of the plurality of cells or network slices;

group, based on a clustering algorithm applied to at least one of (1) the datasets or (2) the plurality of cells or network slices, the datasets into clusters of datasets;

apply, to a subset of most-recent time steps and corresponding values of each dataset of the datasets of a first cluster of the clusters, a transformation to obtain a set of time steps and corresponding standardized values; and train, with the set of time steps and corresponding standardized values for each dataset of the datasets of the first cluster, a machine learning system to generate predicted values at future time steps of the datasets of the first cluster.

2. The computing system of claim 1, wherein the processing circuitry is further configured to:

process, by the trained machine learning system, a first dataset for a first cell or network slice of the plurality of cells or network slices of the mobile network to generate a first predicted value at a first future time step of the first dataset; and modify, based at least in part on the first predicted value at the first future time step, an allocation of a resource of the mobile network for the first cell or network slice.

3. The computing system of claim 2, wherein the processing circuitry is further configured to output the first predicted value at the first future time step.

4. The computing system of claim 2, wherein, to group the datasets into clusters of datasets, the processing circuitry is configured to group the datasets into a single cluster, and wherein, to process the first dataset for the first cell or network slice of the plurality of cells or network slices of the mobile network to generate the first predicted value at the first future time step of the first dataset, the trained machine learning system comprises a uni-model configured to generate the first predicted value at the first future time step of the first dataset, the uni-model trained with a set of time steps and corresponding standardized values for each dataset of the datasets of the single cluster.

5. The computing system of claim 2, wherein, to group the datasets into clusters of datasets, the processing circuitry is configured to group the datasets into a plurality of different clusters, wherein the first cluster comprises the first cell or network slice, and wherein, to process the first dataset for the first cell or network slice of the plurality of cells or network slices of the mobile network to generate the first predicted value at the first future time step of the first dataset, the trained machine learning system comprises a multi-model configured to generate the first predicted value at the first future time step of the first dataset, the multi-model comprising a plurality of models, each trained with a set of time steps and corresponding standardized values for each dataset of the datasets of respective clusters of the plurality of clusters.

6. The computing system of claim 1, wherein, to train, with the set of time steps and corresponding standardized values for each dataset of the datasets of the first cluster, the machine learning system, the datasets of the first cluster do not include a first dataset for a first cell or network slice of the plurality of cells or network slices of the mobile network, and wherein the trained machine learning system is configured to generate a first predicted value at a first future time step of the first dataset for the first cell or network slice.

7. The computing system of claim 1, wherein each dataset of the datasets comprises the time steps and corresponding values of bandwidth downlink utilization; and wherein, to adjust the one or more resources allocated to the first cell or network slice, the processing circuitry is configured to adjust a bandwidth allocated to the first cell or network slice.

8. The computing system of claim 1, wherein the performance metric of the respective cell or network slice of the plurality of cells or network slices comprises a 5th Generation network Key Performance Indicator (5G KPI) for a corresponding one of the plurality of cells or network slices.

9. The computing system of claim 1, wherein, to group the datasets into clusters of datasets, the processing circuitry is configured to apply the clustering algorithm to the plurality of cells or network slices to group the datasets into clusters of datasets based on at least one of:

values of a performance metric for each cell or network slice of the plurality of cells or network slices;

a geographic location of each cell or network slice of the plurality of cells or network slices; or a node identifier of each cell or network slice of the plurality of cells or network slices.

10. The computing system of claim 1, wherein the processing circuitry is further configured to execute an rApp for a non-real-time Radio Access Network (RAN) Intelligent Controller (RIC) of an Open Radio Access Network (O-RAN) architecture for a 5th generation (5G) mobile network, wherein the rApp for the non-real-time RIC is configured to perform the obtaining, the grouping, and the applying.

11. The computing system of claim 1, wherein the processing circuitry is further configured to execute an xApp for a near-real-time Radio Access Network (RAN) Intelligent Controller (RIC) of an Open Radio Access Network (O-RAN) architecture for a 5th generation (5G) mobile network, wherein the xApp for the near-real-time RIC is configured to perform the obtaining, the grouping, and the applying.

12. The computing system of claim 1, wherein the machine learning system comprises a first machine learning system of a plurality of machine learning systems, and wherein the processing circuitry is further configured to train, for each cluster of the clusters, a different machine learning system of the plurality of machine learning systems with sets of time steps and corresponding standardized values for datasets of the respective cluster of the clusters.

13. A method comprising:

obtaining, by processing circuitry of a computing system, respective datasets for a plurality of cells or network slices of a mobile network, each dataset of the datasets comprising time steps and respective values for a performance metric of the corresponding one of the plurality of cells or network slices;

grouping, by the processing circuitry and based on a clustering algorithm applied to at least one of (1) the datasets or (2) the plurality of cells or network slices, the datasets into clusters of datasets;

applying, by the processing circuitry and to a subset of most-recent time steps and corresponding values of each dataset of the datasets of a first cluster of the clusters, a transformation to obtain a set of time steps and corresponding standardized values; and training, by the processing circuitry and with the set of time steps and corresponding standardized values for each dataset of the datasets of the first cluster, a machine learning system to generate predicted values at future time steps of the datasets of the first cluster.

14. The method of claim 13, further comprising:

processing, by the trained machine learning system, a first dataset for a first cell or network slice of the plurality of cells or network slices of the mobile network to generate a first predicted value at a first future time step of the first dataset; and modify, by the processing circuitry and based at least in part on the first predicted value at the first future time step, an allocation of a resource of the mobile network for the first cell or network slice.

15. The method of claim 13, wherein each dataset of the datasets comprises the time steps and corresponding values of bandwidth downlink utilization; and wherein, to adjust the one or more resources allocated to the first cell or network slice, the processing circuitry is configured to adjust a bandwidth allocated to the first cell or network slice.

16. The method of claim 13, wherein the performance metric of the respective cell or network slice of the plurality of cells or network slices comprises a 5th Generation network Key Performance Indicator (5G KPI) for a corresponding one of the plurality of cells or network slices.

17. The method of claim 13, wherein grouping the datasets into clusters of datasets comprises applying the clustering algorithm to the plurality of cells or network slices to group the datasets into clusters of datasets based on at least one of:

values of a performance metric for each cell or network slice of the plurality of cells or network slices;

a geographic location of each cell or network slice of the plurality of cells or network slices; or a node identifier of each cell or network slice of the plurality of cells or network slices.

18. The method of claim 13, further comprising executing an rApp for a non-real-time Radio Access Network (RAN) Intelligent Controller (RIC) of an Open Radio Access Network (O-RAN) architecture for a 5th generation (5G) mobile network, wherein the rApp for the non-real-time RIC is configured to perform the obtaining, the grouping, and the applying.

19. The method of claim 13, further comprising executing an xApp for a near-real-time Radio Access Network (RAN) Intelligent Controller (RIC) of an Open Radio Access Network (O-RAN) architecture for a 5th generation (5G) mobile network, wherein the xApp for the near-real-time RIC is configured to perform the obtaining, the grouping, and the applying.

20. A computing system comprising processing circuitry having access to a memory, the processing circuitry configured to:

execute a machine learning system configured to process a first dataset for a first cell or network slice of a plurality of cells or network slices of a mobile network to generate a first predicted value at a first future time step of the first dataset, wherein respective datasets for the plurality of cells or network slices, each dataset of the datasets comprising time steps and respective values for a performance metric of the corresponding one of the plurality of cells or network slices, are grouped, based on a clustering algorithm applied to at least one of (1) the datasets or (2) the plurality of cells or network slices, into clusters of datasets, wherein a transformation is applied to a subset of most-recent time steps and corresponding values of each dataset of the datasets of a first cluster of the clusters to obtain a set of time steps and corresponding standardized values, and wherein the machine learning system is trained, with the set of time steps and corresponding standardized values for each dataset of the datasets of the first cluster, to generate predicted values at future time steps of the datasets of the first cluster; and modify, based at least in part on the first predicted value at the first future time step, an allocation of a resource of the mobile network for the first cell or network slice.

* * * * *